United States Patent
Kim

(10) Patent No.: US 11,019,532 B2
(45) Date of Patent: *May 25, 2021

(54) METHOD AND APPARATUS FOR ACCELERATING DATA PROCESSING IN WIRELESS COMMUNICATION SYSTEM

(71) Applicant: Samsung Electronics Co., Ltd., Suwon-si (KR)

(72) Inventor: Donggun Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/931,994

(22) Filed: Jul. 17, 2020

(65) Prior Publication Data

US 2020/0351711 A1 Nov. 5, 2020

Related U.S. Application Data

(63) Continuation of application No. 16/003,500, filed on Jun. 8, 2018, now Pat. No. 10,721,650.

(30) Foreign Application Priority Data

Jun. 9, 2017 (KR) .................. 10-2017-0072555
Oct. 24, 2017 (KR) .................. 10-2017-0138623

(51) Int. Cl.
*H04W 28/06* (2009.01)
*H04W 72/12* (2009.01)
(Continued)

(52) U.S. Cl.
CPC ....... *H04W 28/06* (2013.01); *H04W 72/1268* (2013.01); *H04W 72/14* (2013.01); *H04L 47/34* (2013.01); *H04W 28/0289* (2013.01)

(58) Field of Classification Search
CPC . H04W 28/06; H04W 72/1268; H04W 72/14; H04W 28/0289; H04L 47/34
See application file for complete search history.

(56) References Cited

U.S. PATENT DOCUMENTS

| 10,721,650 B2* | 7/2020 | Kim ................. H04W 72/1268 |
| 2010/0232356 A1* | 9/2010 | Maheshwari ......... H04L 1/1867 370/328 |

(Continued)

FOREIGN PATENT DOCUMENTS

| CN | 104041131 A | 9/2014 |
| CN | 106413095 A | 2/2017 |

(Continued)

OTHER PUBLICATIONS

Indian Examination Report dated May 22, 2020, issued in Indian Patent Application No. 201814021567.

(Continued)

*Primary Examiner* — Maharishi V Khirodhar
*Assistant Examiner* — Kenneth P Hunt
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method by a terminal configured with a dual connectivity for processing data is provided. The method includes acquiring the data, determining a cell group to preprocess the data based on an amount of the data and a threshold value, preprocessing the data by the determined (Continued)

cell group before receiving an uplink grant for transmitting the data, and determining a radio link control (RLC) sequence number of the preprocessed data based on the uplink grant if the uplink grant is received.

20 Claims, 25 Drawing Sheets

(51) Int. Cl.
*H04W 72/14* (2009.01)
*H04L 12/801* (2013.01)
*H04W 28/02* (2009.01)

(56) References Cited

U.S. PATENT DOCUMENTS

| | | |
|---|---|---|
| 2015/0023194 A1 | 1/2015 | Seo et al. |
| 2017/0289890 A1 | 10/2017 | Jung et al. |
| 2018/0206213 A1 | 7/2018 | Kim et al. |
| 2018/0279173 A1* | 9/2018 | Loehr ................ H04W 28/065 |
| 2018/0317115 A1 | 11/2018 | Loehr et al. |
| 2018/0352556 A1 | 12/2018 | Loehr et al. |
| 2019/0306871 A1 | 10/2019 | Liu et al. |

FOREIGN PATENT DOCUMENTS

| | | |
|---|---|---|
| EP | 2 654 229 A1 | 10/2013 |
| WO | 2016/043559 A | 3/2016 |

OTHER PUBLICATIONS

Ericsson, "PDCP Uplink transmit operation", 3GPP Draft; R2-1704681—PDCP Uplink Transmit Operation, 3rd Generation Partnership Project (3GPP), Mobile Competence Centre; 650, Route Des Lucioles; F-06921 Sophia-Antipolis Cedex; France, vol. RAN WG2. No. Hangzhou; May 15, 2017 May 19, 2017, May 14, 2017, XP051275226.
Samsung, "Clarification on threshold based solution for UL split bearer", 3GPP Draft; R2-1705817, Clarification on Threshold Based Solution for UL Split Bearer, 3rd Generation Partnership Project (3GPP), Mobile Competence Centre; 650, Route Des Lucioles; F-06921 Sophia-Ant, vol. RAN WG2, No. Hangzhou, China; May 15, 2017-May 19, 2017, May 14, 2017, XP051276096.
Ericsson (Rapporteur), "UL Split in Dual Connectivity", 3GPP Draft; R2-1704381—Email Discussion Report on UL Split Operation, 3rd Generation Partnership Project (3GPP), Mobile Competence Centre; 650, Route Des Lucioles; F-06921 Sophia-Antipolis Cedex, vol. RAN WG2. No. Hangzhou, China; May 15, 2017-May 19, 2017, May 6, 2017. XP051264394.
Samsung, "UL split bearer operation for NR", 3GPP Draft; R2-1705678 UL Split Bearer Operation for NR, 3rd Generation Partnership Project (3GPP), Mobile Competence Centre; 550, Route Des Lucioles; F-06921 Sophia-Antipolis Cedex; France, vol. RAN WG2. No. Hangzhou, China; May 15, 2017-May 19, 2017, May 14, 2017, XP051275992.
Samsung, "Pre-processing for LTE-NR DC", 3GPP Draft; R2-1703572 Pre-Processing for NR-NR DC, 3rd Generation Partnership Project (3GPP), Mobile Competence Centre; 650, Route Des Lucioles; F-06921 Sophia-Antipolis Cedex; France, vol. RAN WG2. No. Spokane, USA; Apr. 3, 2017-J0170407, Apr. 3, 2017, XP051245411.
Samsung, "Pre-processing for LTE-NR DC", 3GPP Draft; R2-1703571 Pre-Processing for LTE-NR DC, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-J0170407, Apr. 3, 2017, XP051245410.
European Search Report dated Nov. 19, 2018, issued in European Patent Application No. 18176969.6.
Chinese Office Action dated Apr. 2, 2021, issued in Chinese Application No. 201810595411.8.

* cited by examiner

| RLC SN | 2nd buffer Start link | 2nd buffer End link | 1th buffer Start link | 1th buffer End link | Seg. Info. | ACK/NACK |
|---|---|---|---|---|---|---|
| 1 | k | l | a | b | SI / SO | - |
| 2 | l+1 | m | b+1 | c | SI / SO | - |
| 3 | m+1 | n | c+1 | d | SI / SO | - |
| 4 | n+1 | o | d+1 | e | SI / SO | - |
| - | - | - | - | - | SI / SO | - |

830

| RLC SN | 3rd buffer Start link | 3rd buffer End link | 1th buffer Start link | 1th buffer End link | Seg. Info. | ACK/NACK |
|---|---|---|---|---|---|---|
| 1 | t | u | e | f | SI / SO | - |
| 2 | u+1 | v | f+1 | g | SI / SO | - |
| 3 | v+1 | w | g+1 | h | SI / SO | - |
| - | - | - | - | - | SI / SO | - |
| - | - | - | - | - | SI / SO | - |

| PDCP SN | link | RLC SN | Buffer 2 Start link | Buffer 2 End link | Buffer 2(SN) Start link | Buffer 2(SN) End link | Buffer 1 Start link | Buffer 1 End link | Seg. Info. | ACK/NACK |
|---|---|---|---|---|---|---|---|---|---|---|
| 1 | 0 | 1 | i | j | q | r | a | b | SI / SO | - |
| 2 | 0 | 2 | j+1 | k | s | t | b+1 | c | SI / SO | - |
| 3 | 0 | 3 | k+1 | l | u | v | c+1 | d | SI / SO | - |
| 4 | 0 | 4 | l+1 | m | w | x | d+1 | e | SI / SO | - |
| 5 | 0 | 5 | m+1 | n | y | z | e+1 | f | SI / SO | - |
| 6 | 1 | 1 | n+1 | o | a1 | b1 | f+1 | g | SI / SO | - |
| 7 | 1 | 2 | o+1 | p | c1 | d1 | g+1 | h | SI / SO | - |

Perform virtual RLC SN allocation

940

| PDCP SN | link | RLC SN | Buffer 2 Start link | Buffer 2 End link | Buffer 2(SN) Start link | Buffer 2(SN) End link | Buffer 1 Start link | Buffer 1 End link | Seg. Info. | ACK/NACK |
|---|---|---|---|---|---|---|---|---|---|---|
| 1 | 0 | 1 | i | j | q | r | a | b | SI / SO | - |
| 2 | 0 | 2 | j+1 | k | s | t | b+1 | c | SI / SO | - |
| 3 | 1 | 1 | k+1 | l | u | v | c+1 | d | SI / SO | - |
| 4 | 1 | 2 | l+1 | m | w | x | d+1 | e | SI / SO | - |
| 5 | 0 | 5 | m+1 | n | y | z | e+1 | f | SI / SO | - |
| 6 | 1 | 1 | n+1 | o | a1 | b1 | f+1 | g | SI / SO | - |
| 7 | 1 | 2 | o+1 | p | c1 | d1 | g+1 | h | SI / SO | - |

925 Perform actual RLC SN reallocation

930 Need to perform virtual RLC SN reallocation

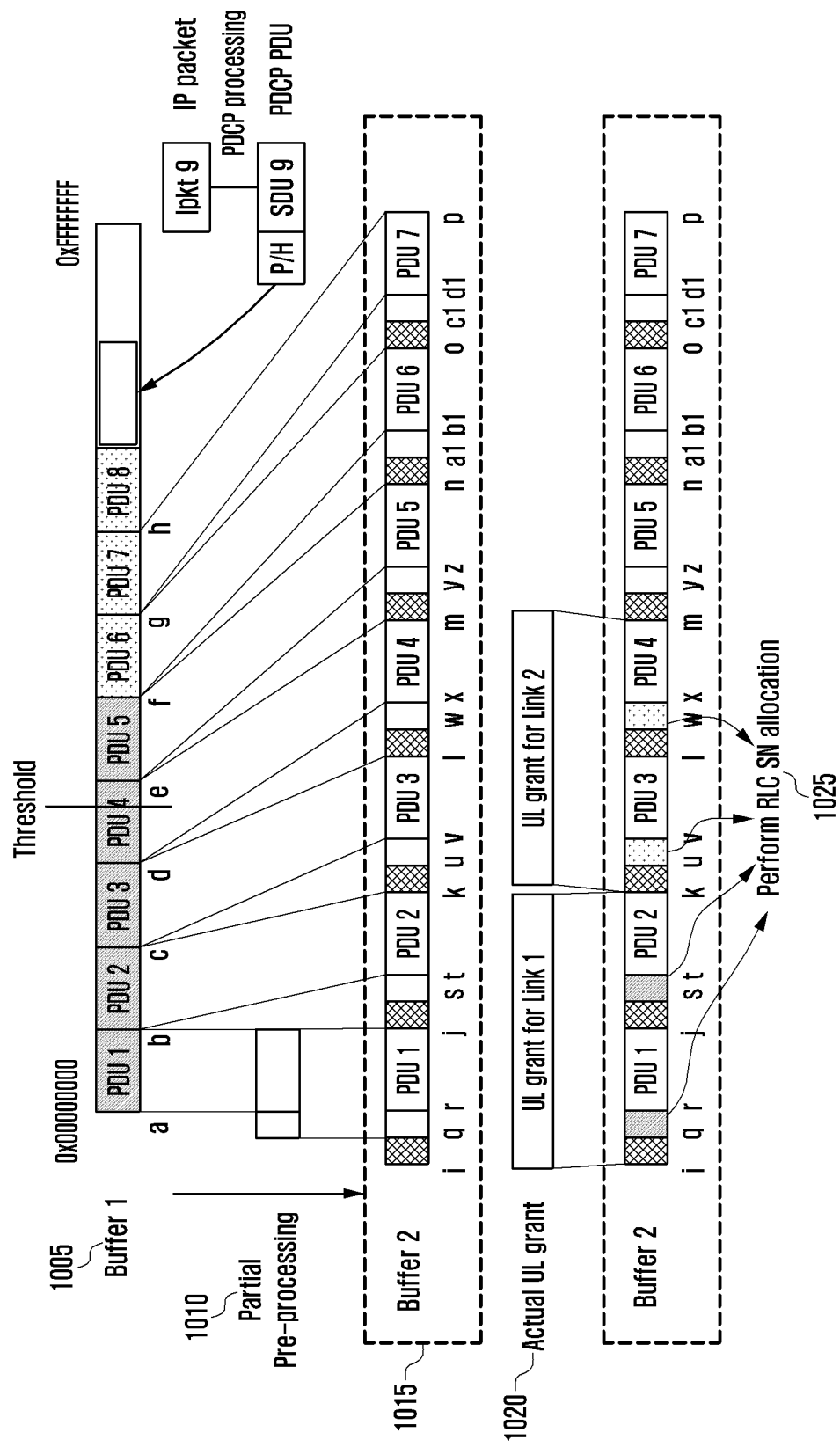

FIG. 10B

| PDCP SN | link | RLC SN | Buffer 2 Start link | Buffer 2 End link | Buffer 2(SN) Start link | Buffer 2(SN) End link | Buffer 1 Start link | Buffer 1 End link | Seg. Info. | ACK/NACK |
|---|---|---|---|---|---|---|---|---|---|---|
| 1 | | | i | j | q | r | a | b | SI / SO | - |
| 2 | | | j+1 | k | s | t | b+1 | c | SI / SO | - |
| 3 | | | k+1 | l | u | v | c+1 | d | SI / SO | - |
| 4 | | | l+1 | m | w | x | d+1 | w | SI / SO | - |
| 5 | | | m+1 | n | y | z | m+1 | y | SI / SO | - |
| 6 | | | n+1 | o | a1 | b1 | f+1 | g | SI / SO | - |
| 7 | | | o+1 | p | c1 | d1 | g+1 | h | SI / SO | - |

| PDCP SN | link | RLC SN | Buffer 2 Start link | Buffer 2 End link | Buffer 2(SN) Start link | Buffer 2(SN) End link | Buffer 1 Start link | Buffer 1 End link | Seg. Info. | ACK/NACK |
|---|---|---|---|---|---|---|---|---|---|---|
| 1 | 0 | 1 | i | j | q | r | a | b | SI/SO | - |
| 2 | 0 | 2 | j+1 | k | s | t | b+1 | c | SI/SO | - |
| 3 | 1 | 1 | k+1 | l | u | v | c+1 | d | SI/SO | - |
| 4 | 1 | 2 | l+1 | m | w | x | d+1 | w | SI/SO | - |
| 5 | | | m+1 | n | y | z | m+1 | y | SI/SO | - |
| 6 | | | n+1 | o | a1 | b1 | f+1 | g | SI/SO | - |
| 7 | | | o+1 | p | c1 | d1 | g+1 | h | SI/SO | - |

1035

Perform RLC SN allocation (PDCP SN 1–4)

METHOD AND APPARATUS FOR ACCELERATING DATA PROCESSING IN WIRELESS COMMUNICATION SYSTEM

CROSS-REFERENCE TO RELATED APPLICATION(S)

This application is a continuation application of prior application Ser. No. 16/003,500, filed on Jun. 8, 2018, which issued as U.S. Pat. No. 10,721,650 on Jul. 21, 2020; and is based on and claims priority under 35 U.S.C. § 119(a) of a Korean patent application number 10-2017-0072555, filed on Jun. 9, 2017, in the Korean Intellectual Property Office, and under 35 U.S.C. § 119(a) of a Korean patent application number 10-2017-0138623, filed Oct. 24, 2017, in the Korean Intellectual Property Office, the disclosure of which is incorporated by reference herein in its entirety.

BACKGROUND

1. Field

The disclosure relates to a method and an apparatus for accelerating data processing in a wireless communication system. More particularly, the disclosure relates to a method and an apparatus for implementing acceleration of data processing of a terminal by applying data preprocessing technology in case where the terminal of a next-generation mobile communication system transmits data to an uplink using dual connectivity technology.

2. Description of the Related Art

To meet the demand for wireless data traffic having increased since deployment of 4G communication systems, efforts have been made to develop an improved 5G or pre-5G communication system. The 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as various devices, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

On the other hand, in the next-generation communication system, various researches for improving a data processing speed have been made to achieve the above-described purposes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

In the next-generation mobile communication system, it is required to support a maximum data rate of 20 Gbps in a downlink and a maximum data rate of 10 Gbps in an uplink, and a very short delay response time is required. Accordingly, in case of a terminal being serviced in the next-generation mobile communication system, a very high data processing speed is necessary. Accordingly, a method for accelerating data processing of the terminal is very important, and particularly in high-speed data transmission, dual connectivity technology may be very useful. Since it may be advantageous in the high-speed data transmission to apply data preprocessing technology capable of accelerating the data processing in the dual connectivity technology, the disclosure proposes a method for implementing the data preprocessing technology in which the terminal can accelerate the data processing in a dual connectivity environment.

A long term evolution (LTE) system has a data processing structure that is different from that of the next-generation mobile communication system. Specifically, in the LTE system, a radio link control (RLC) layer performs an RLC concatenation function, and thus a terminal is unable to perform certain data preprocessing until it receives an uplink grant from a network. If the uplink grant is received, a packet data convergence protocol (PDCP) layer makes one RLC packet data unit (PDU) by concatenating PDCP PDUs, and sends the RLC PDU to a medium access control (MAC) layer to proceed with data transmission. In contrast, in the next-generation mobile communication system, since the RLC layer does not have the RLC concatenation function, the RLC layer makes the RLC PDU by processing the PDCP PDUs transferred from the PDCP layer before receiving the uplink grant, and sends the RLC PDU to the MAC layer. The MAC layer has the data processing structure capable of pre-generating up to a MAC sub-header and a MAC SDU.

Accordingly, in the next-generation mobile communication system, it is possible to apply the data preprocessing technology, and an embodiment of the disclosure proposes a method and an apparatus for effectively implementing the above-described technology even in the dual connectivity environment.

Additional aspects will be set forth in part in the description which follows and, in part, will be apparent from the description, or may be learned by practice of the presented embodiments.

In accordance with an aspect of the disclosure, a method by a terminal configured with a dual connectivity for processing data is provided. The method includes acquiring the data, determining a cell group to preprocess the data based on an amount of the data and a threshold value, preprocessing the data by the determined cell group before receiving an uplink grant for transmitting the data, and determining a RLC sequence number of the preprocessed data based on the uplink grant if the uplink grant is received.

In accordance with another aspect of the disclosure, a terminal configured with a dual connectivity is provided. The terminal includes a transceiver configured to transmit and receive signals, and a controller configured to acquire data, determine a cell group to preprocess the data based on an amount of the data and a threshold value, preprocess the data by the determined cell group before receiving an uplink grant for transmitting the data, and determine a RLC sequence number of the preprocessed data based on the uplink grant if the uplink grant is received.

According to an embodiment of the disclosure, it is possible to provide a method and an apparatus for accelerating data processing in a wireless communication system.

Further, according to an embodiment of the disclosure, an effective method for implementing data preprocessing technology is proposed, in which a terminal can accelerate data processing in a dual connectivity environment, and thus a high data rate can be supported in the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, and 8C are diagrams illustrating a first embodiment for implementing a data preprocessing operation of a terminal in multiple connectivity according to various embodiments of the disclosure;

FIGS. 9A and 9B are diagrams illustrating a second embodiment for implementing a data preprocessing operation of a terminal in multiple connectivity according to various embodiments of the disclosure;

FIGS. 10A, 10B, and 10C are diagrams illustrating a third embodiment for implementing a data preprocessing operation of a terminal in multiple connectivity according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure, related well-known functions or configurations incorporated herein are not described in detail in the case where it is determined that they obscure the subject matter of the disclosure in unnecessary detail. Hereinafter, embodiments of the disclosure will be described with reference to the accompanying drawings.

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Hereinafter, for convenience in explanation, terms and titles that are defined in the $3^{rd}$ generation partnership project long term evolution (3GPP LTE) standards are used in the disclosure. However, the disclosure is not limited by the terms and titles, but can be equally applied to systems following other standards.

Figure 1:
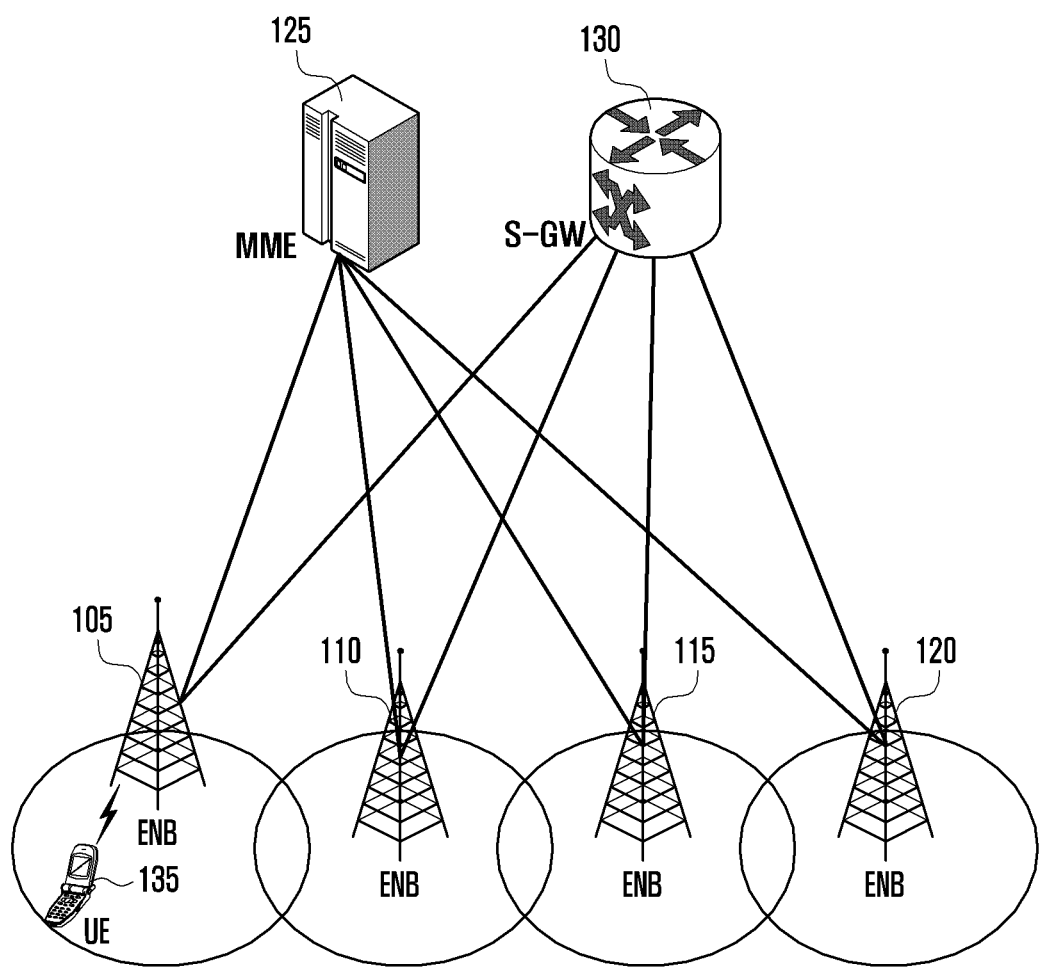
FIG. 1 is a diagram illustrating the structure of an LTE system according to an embodiment of the disclosure.

FIG. 1 is a diagram illustrating the structure of an LTE system according to an embodiment of the disclosure.

Referring to FIG. 1, a radio access network (RAN) of an LTE system is composed of evolved node Bs (hereinafter referred to as "ENBs", "node Bs", or "base stations") 105, 110, 115, and 120, a mobility management entity (MME) 125, and a serving-gateway (S-GW) 130. User equipment (hereinafter referred to as "UE" or "terminal") aa-35 accesses to an external network through the ENBs 105 to 120 and the S-GW 130.

In FIG. 1, the ENB 105 to 120 corresponds to an existing node B of a universal mobile telecommunication system (UMTS). The ENB is connected to the UE 135 on a radio channel, and plays a more complicated role than that of the existing node B. In the LTE system, since all user traffic including a real-time service, such as a voice over IP (VoIP) through an internet protocol are serviced on shared channels, devices performing scheduling through consolidation of state information, such as a buffer state, an available transmission power state, and a channel state of each UE, are necessary, and the ENBs 105 to 120 correspond to such scheduling devices. In general, one ENB controls a plurality of cells. For example, in order to implement a transmission speed of 100 Mbps, the LTE system uses, for example, orthogonal frequency division multiplexing (OFDM) in a bandwidth of 20 MHz as a radio access technology. The LTE system adopts an adaptive modulation & coding (AMC) scheme that determines a modulation scheme and a channel coding rate to match the channel state of the terminal. The S-GW 130 is a device that provides a data bearer, and generates or removes the data bearer under the control of the MME 125. The MME is a device that takes charge of not only mobility management of the terminal but also various kinds of control functions, and is connected to the plural base stations.

Figure 2:
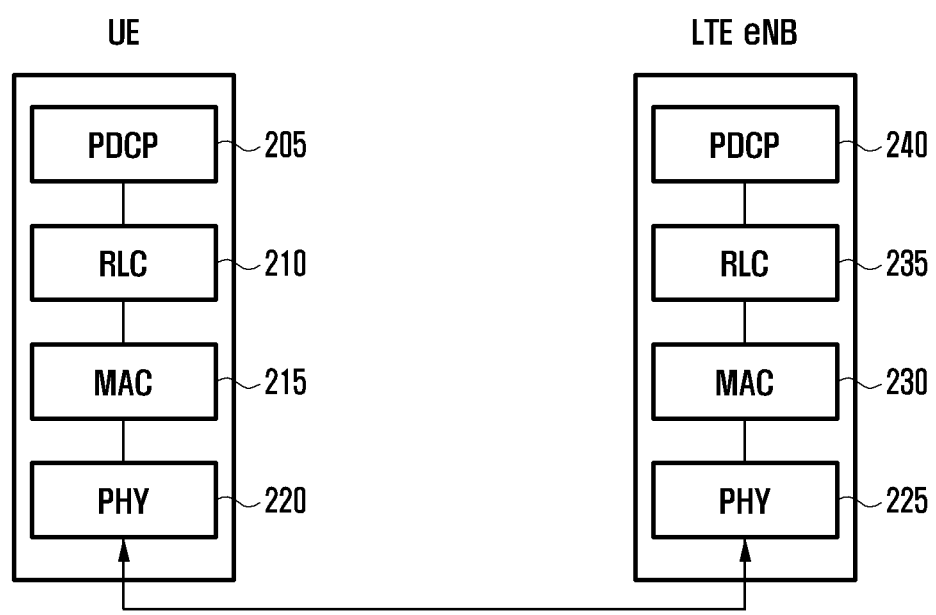
FIG. 2 is a diagram illustrating a radio protocol structure of an LTE system according to an embodiment of the disclosure.

FIG. 2 is a diagram illustrating a radio protocol structure of an LTE system according to an embodiment of the disclosure.

Referring to FIG. 2, in UE or an ENB, a radio protocol of an LTE system is composed of a packet data convergence protocol (PDCP) 205 or 240, a radio link control (RLC) 210 or 235, and a medium access control (MAC) 215 or 230. The PDCP 205 or 240 takes charge of IP header compression/decompression operations. The main functions of the PDCP are summarized as follows.

Header compression and decompression: ROHC only
    Transfer of user data
    In-sequence delivery of upper layer PDUs at a PDCP reestablishment procedure for RLC AM
    For split bearers in DC (only support for RLC AM): PDCP PDU routing for transmission and PDCP PDU reordering for reception
    Duplicate detection of lower layer SDUs at PDCP reestablishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in an uplink The radio link control (hereinafter referred to as "RLC") 210 or 235 reconfigures a PDCP packet data unit (PDU) with a proper size and performs an ARQ operation. The main functions of the RLC are summarized as follows.

Transfer of upper layer PDUs
    Error correction through ARQ (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM transfer)
    RLC reestablishment The MAC 215 or 230 is connected to several RLC layer devices configured in one terminal, and performs multiplexing/demultiplexing of RLC PDUs into/from MAC PDU. The main functions of the MAC are summarized as follows.

Mapping between logical channels and transport channels
    Multiplexing/demultiplexing of MAC SDUs belonging to one or different logical channels into/from transport blocks (TB) delivered to/from the physical layer on transport channels
    Scheduling information reporting
    HARQ function (error correction through HARQ)
    Priority handling between logical channels of one UE
    Priority handling between UEs by means of dynamic scheduling
    MBMS service identification
    Transport format selection
    padding The physical layer 220 or 225 performs channel coding and modulation of upper layer data to configure and transmit OFDM symbols to a radio channel, or performs demodulation and channel decoding of the OFDM symbols received on the radio channel to transfer the demodulated and channel-decoded data to an upper layer.

Figure 3:
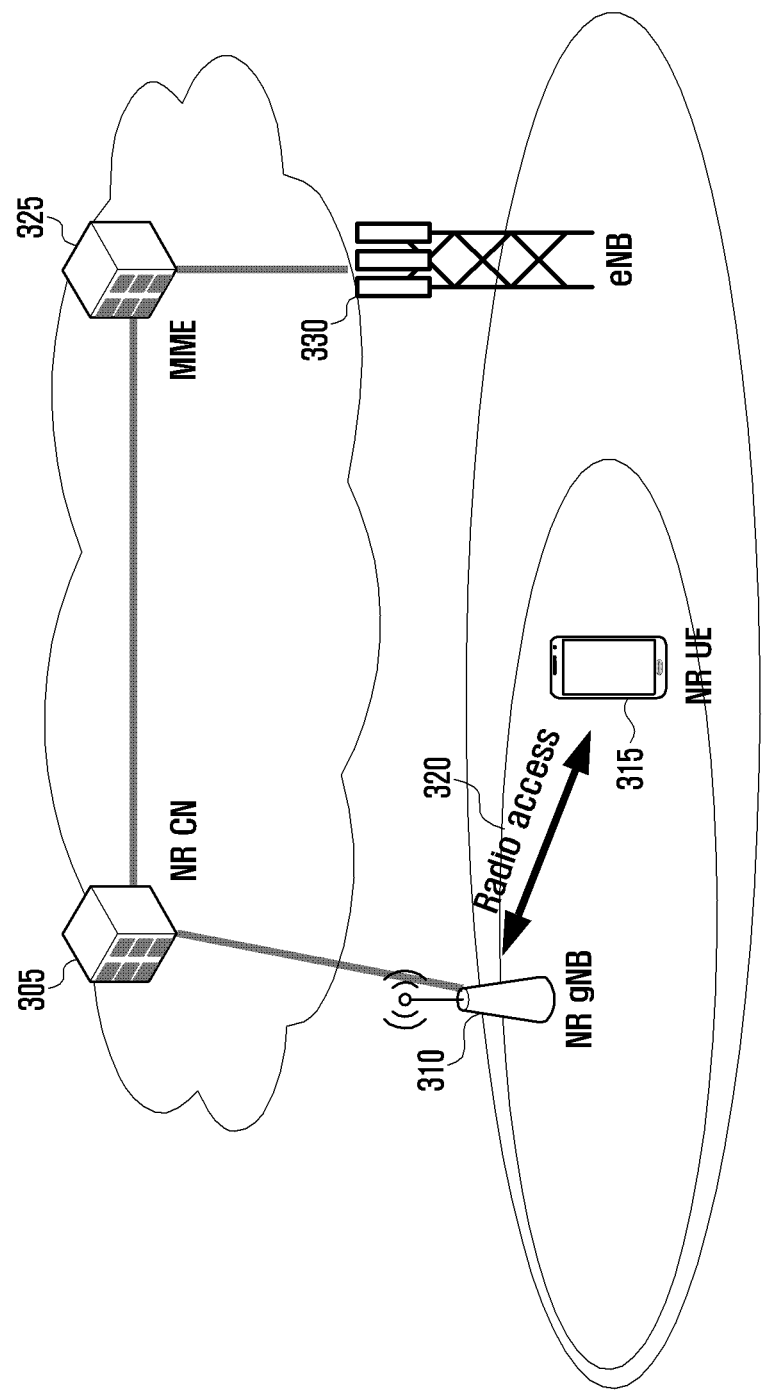
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

Referring to FIG. 3, a RAN of a next-generation mobile communication system (hereinafter referred to as "NR" or "5G") is composed of a new radio node B (hereinafter referred to as "NR gNB" or "NR ENB") 310 and a new radio core network (NR CN) 305. A new radio user equipment (hereinafter referred to as "NR UE" or "terminal") 315 accesses an external network through the NR gNB 310 and the NR CN 305 via radio access 320.

In FIG. 3, the NR gNB 310 corresponds to an evolved node B (ENB) of the existing LTE system. The NR gNB is connected to the NR UE 315 on a radio channel, and thus the NR gNB can provide a more superior service than the service of the existing node B. Since all user traffic is serviced on shared channels in the next-generation mobile communication system, a device that performs scheduling through consolidation of status information, such as a buffer state, an available transmission power state, and a channel state of each UE, is necessary, and the NR gNB 310 takes charge of this. One NR gNB generally controls a plurality of cells. In order to implement ultrahigh-speed data transmission as compared with the existing LTE, the NR gNB or cell may have the existing maximum bandwidth or more, and a beamforming technology may be additionally grafted in consideration of OFDM as a radio connection technology. Further, an AMC scheme determining a modulation scheme and a channel coding rate to match the channel state of the UE is adopted. The NR CN 305 performs functions of mobility support, bearer configuration, and QoS configuration. The NR CN is a device taking charge of not only terminal mobility management but also various kinds of control functions, and is connected to a plurality of ENBs. The next-generation mobile communication system may also interlock with the existing LTE system, and the NR CN is connected to an MME 325 through a network interface. The MME is connected to an ENB 330 that is an existing base station.

Figure 4:
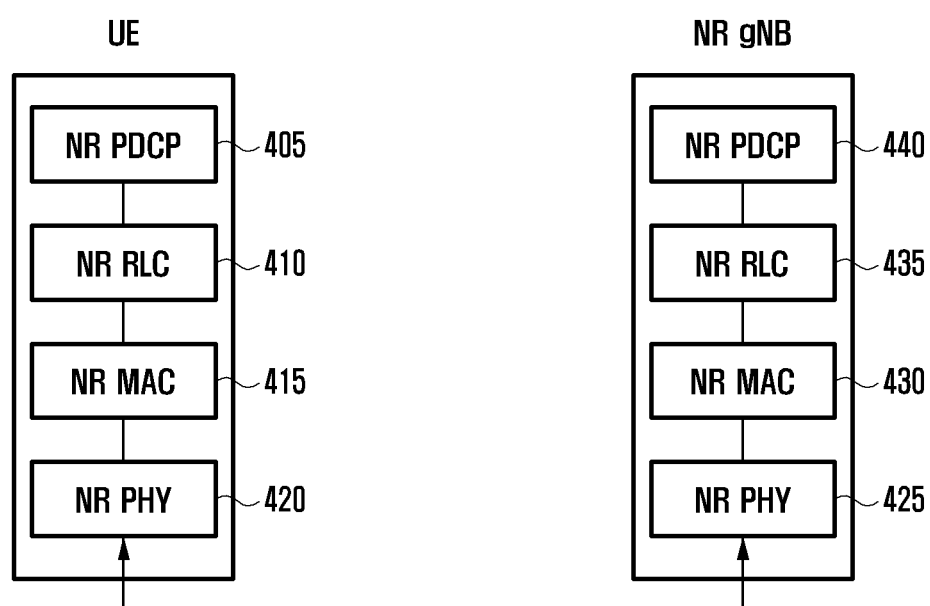
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, in UE or an NR ENB, a radio protocol of the next-generation mobile communication system is composed of an NR PDCP 405 or 440, an NR RLC 410 or 435, and an NR MAC 415 or 430. The main function of the NR PDCP 405 or 440 may include parts of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink As described above, reordering of the NR PDCP devices may mean reordering of PDCP PDUs received from a lower layer based on PDCP sequence numbers (SNs), and the reordering may include delivery of data to an upper layer in the order of the reordering. Further, the recording of the NR PDCP devices may include recording of the lost PDCP PDUs through the reordering, status report for the lost PDCP PDUs to a transmission side, and request for retransmission of the lost PDCP PDUs.

The main functions of the NR RLC 410 or 435 may include parts of the following functions:

Transfer of upper layer PDUs
In-sequence delivery of upper layer PDUs
Out-of-sequence delivery of upper layer PDUs
Error correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of NR RLC devices may mean in-sequence delivery of RLC SDUs received from a lower layer to an upper layer. In the case where one original RLC SDU is segmented into several RLC SDUs to be received, the in-sequence delivery of the NR RLC devices may include reassembly and delivery of the RLC SDUs. The in-sequence delivery of the NR RLC devices may include reordering of the received RLC PDUs based on an RLC sequence number (SN) or a PDCP sequence number (SN), and recording of lost RLC PDUs through reordering. The in-sequence delivery of the NR RLC devices may include performing of status report for the lost RLC PDUs to a transmission side, and request for retransmission of the lost PDCP PDUs. The in-sequence delivery of the NR RLC devices may include in-sequence delivery of only RLC SDUs just before the lost RLC SDUs to an upper layer if there are the lost RLC SDUs. The in-sequence delivery of the NR RLC devices may include in-sequence delivery of all the RLC SDUs received before a specific timer starts its operation to an upper layer if the timer has expired although there are the lost RLC SDUs, or in-sequence delivery of all the RLC SDUs received up to now to an upper layer if the timer has expired although there are the lost RLC SDUs. The RLC PDUs may be processed in the order of their reception (regardless of the order of the sequence numbers, but in the order of their arrival), and then they may be transferred to a PDCP device in an out-of-sequence delivery manner. In case of segments, the segments stored in a buffer or to be received later are received and reconfigured into one complete RLC PDU to be processed and transferred to the PDCP device. The NR RLC layer may not include a concatenation function, and the function may be performed by an NR MAC layer or may be replaced by a multiplexing function of the NR MAC layer.

As described above, the out-of-sequence delivery by the NR RLC device means a function of transferring the RLC SDUs received from a lower layer directly to an upper layer regardless of the order of the received RLC SDUs. If the one original RLC SDU is segmented into several RLC SDUs to be received, the out-of-sequence delivery may include reassembly and delivery of the RLC SDUs, and recording of the lost RLC PDUs through storing and ordering the RLC SNs or PDCP SNs of the received RLC PDUs.

The NR MAC 415 or 430 may be connected to several NR RLC layer devices configured in one terminal, and the main functions of the NR MAC may include parts of the following functions:

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
padding The NR PHY layer 420 or 425 may perform channel coding and modulation of upper layer data to make and transmit OFDM symbols on a radio channel, or may perform demodulation and channel decoding of the OFDM symbols received on the radio channel to transfer the demodulated and channel-decoded data to an upper layer.

Figure 5A:
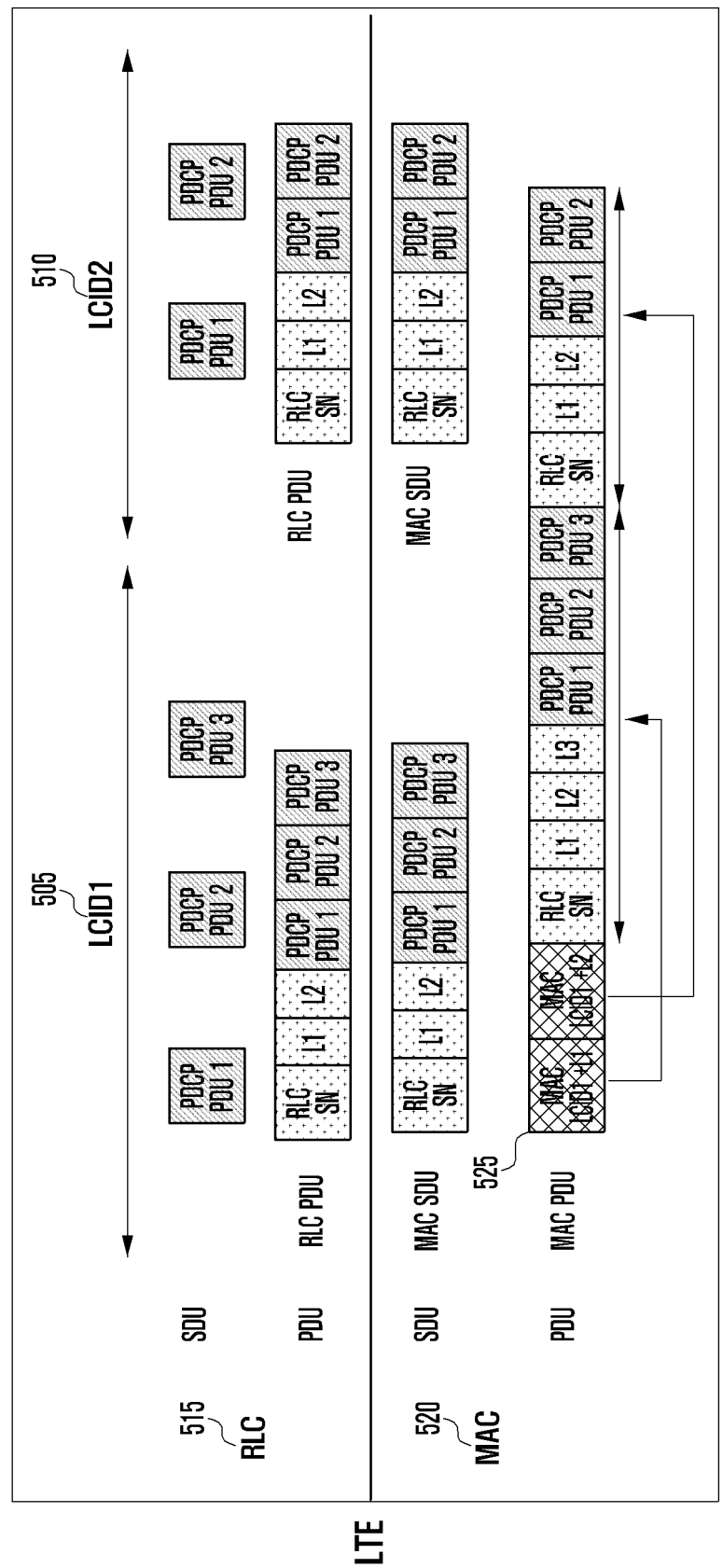
FIGS. 5A and 5B are diagrams illustrating a data processing structure in an LTE system according to various embodiments of the disclosure.
Figure 5B:
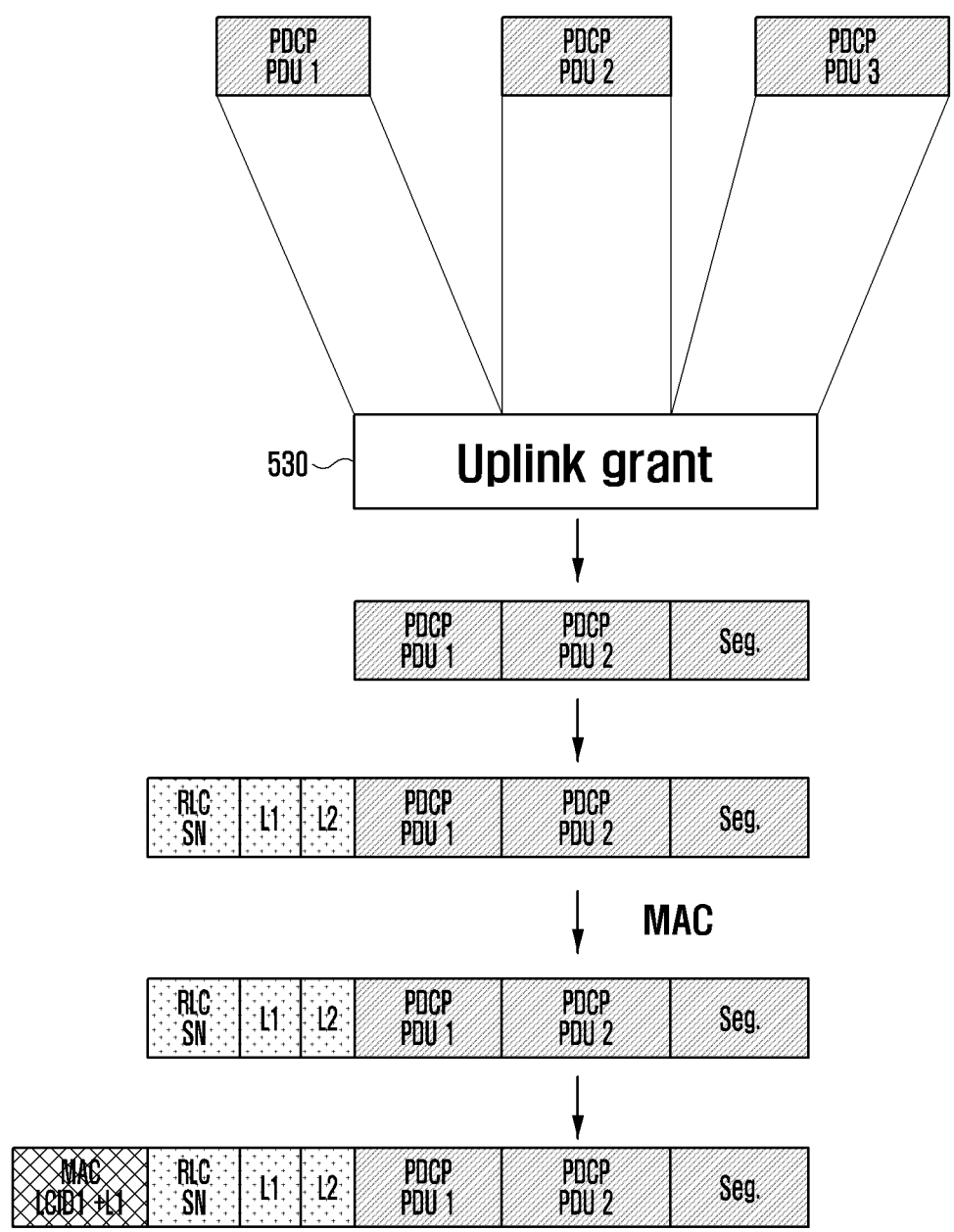

FIGS. 5A and 5B are diagrams illustrating a data processing structure in an LTE system according to various embodiments of the disclosure. Hereinafter, FIGS. 5A and 5B are commonly called FIG. 5.

Referring to FIG. 5A, an LTE system performs PDCP-layer and RLC-layer data processing for logical channels. Logical channel 1 505 and logical channel 2 510 have different PDCP layers and RLC layers, and perform independent data processing. The LTE system transfers RLC PDUs generated from RLC layers of the respective logical channels to a MAC layer to configure one MAC PDU, and transmits the MAC PDU to a receiving end. In the LTE system, the PDCP layer, the RLC layer 515, and the MAC layer 520 may include the functions as described above with reference to FIG. 2, and may perform operations corresponding to the functions.

In the LTE system, the RLC layer may be featured to concatenate PDCP PDUs. In the LTE system, a PDCP PDU structure as denoted by 525 may be featured to have a structure in which all MAC sub-headers are located in front portions of all MAC PDUs, and MAC SDU portions are located in the rear portions of the MAC PDUs. Due to such features, in the LTE system, the RLC layer is unable to pre-perform or prepare data processing before reception of uplink grant.

Referring to FIG. 5B, if the uplink grant 530 is received, the terminal generates an RLC PDU by concatenating PDCP PDUs received from the PDCP layer to match the uplink grant. After the MAC layer receives the uplink grant from a base station, the terminal performs logical channel prioritization (LCP), and divides the uplink grant for the respective logical channels. The uplink grant 530 is an uplink transmission resource allocated from the base station to the MAC layer. If the size of the PDCP PDUs to be concatenated does not match the size of the uplink grant, the RLC layer performs a segmentation procedure to make the PDCP PDUs match the uplink grant. The above-described procedure may be performed for each logical channel, and each RLC device may configure an RLC header using the concatenated PDCP PDUs, and may send the completed RLC PDU to the MAC device. As described above, the MAC device may configure the RLC PDUs (MAC SDUs) received from the respective RLC layers into one MAC PDU to transmit the MAC PDU to a PHY device. If the RLC device performs the segmentation operation and includes segmentation information in the RLC header during configuration of the RLC header, it becomes possible to include length information of the respective concatenated PDCP PDUs in the header (this is to reassemble them at a receiving end).

As described above, the LTE system is featured so that the full-scale data processing of the RLC layer, the MAC layer, and the PHY layer starts from the time when the uplink grant is received.

Figure 6A:
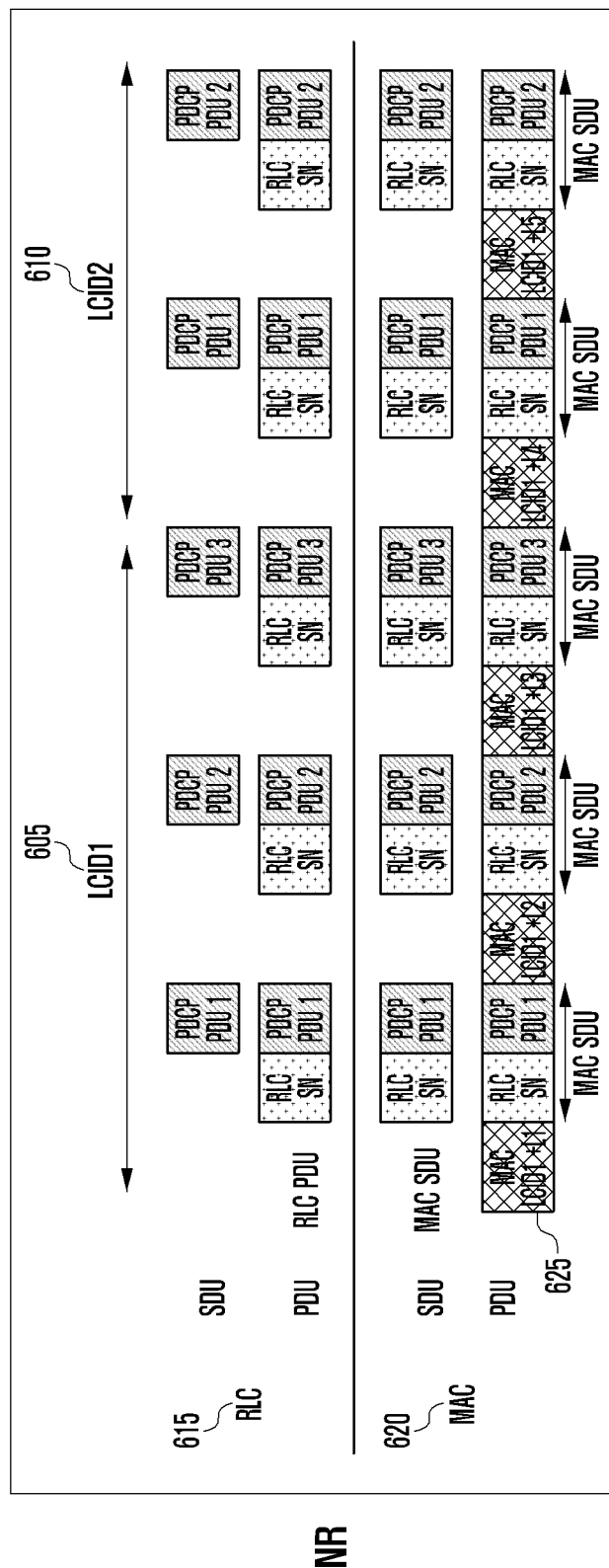
FIGS. 6A and 6B are diagrams illustrating a data processing structure in a next-generation mobile communication system according to various embodiments of the disclosure.
Figure 6B:
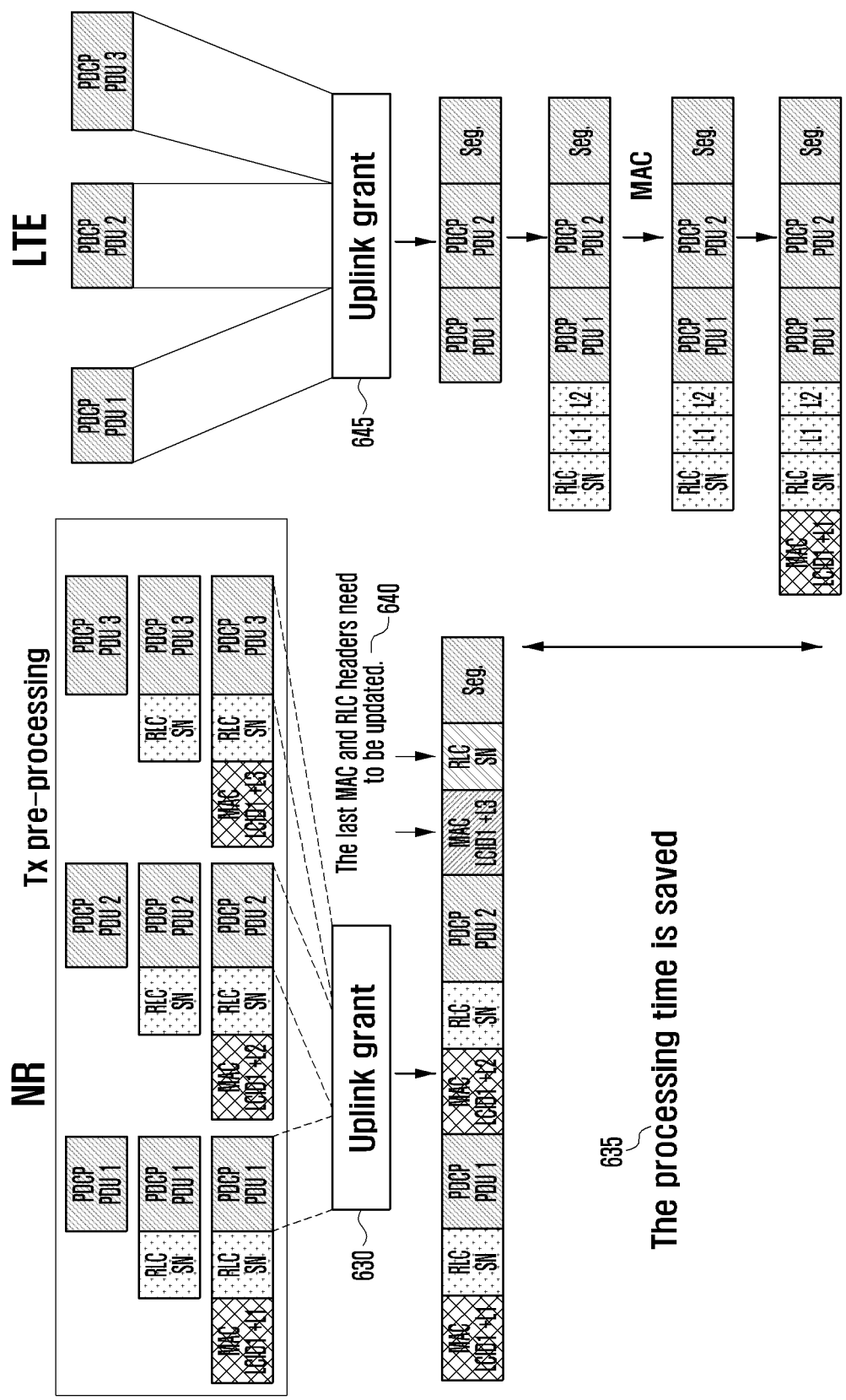

FIGS. 6A and 6B are diagrams illustrating a data processing structure in a next-generation mobile communication system according to various embodiments of the disclosure. Hereinafter, FIGS. 6A and 6B are commonly called FIG. 6.

Referring to FIG. 6A, a next-generation mobile communication system performs PDCP-layer and RLC-layer data processing for logical channels. That is, logical channel 1 605 and logical channel 2 610 have different PDCP layers and RLC layers, and perform independent data processing. The next-generation mobile communication system transfers RLC PDUs generated from RLC layers of the respective logical channels to a MAC layer to configure one MAC PDU, and transmits the MAC PDU to a receiving end. In the next-generation mobile communication system, the PDCP layer, the RLC layer 615, and the MAC layer 620 may include the functions as described above with reference to FIG. 4, and may perform operations corresponding to the functions.

In the next-generation mobile communication system, it is featured that the RLC layer does not concatenate the PDCP PDUs, and a MAC PDU structure, such as 625, is featured to have a structure having MAC sub-headers for respective MAC SDUs, that is, a structure in which the MAC sub-headers are repeated in the unit of MAC SDUs. Accordingly, in the next-generation mobile communication system, data preprocessing may be performed before uplink grant is received (630). If the PDCP layer receives IP packets, a terminal, before receiving the uplink grant, may perform PDCP processing (ciphering and integrity protection) with respect to the received IP packets, and may generate PDCP PDUs through generation of PDCP headers. Further, the terminal may configure RLC PDUs by configuring RLC headers through transfer of the PDCP PDUs to the RLC layer, and may pre-configure MAC sub-headers and MAC SDUs by transferring the RLC PDUs to the MAC layer.

If the terminal receives the uplink grant (630), the terminal may configure MAC PDUs by bring the MAC sub-headers and MAC SDUs to the extent that matches the size of the uplink grant. If the uplink grant is not sufficient, the terminal may perform a segmentation operation in order to fill up full and efficiently use transmission resources. The RLC headers (segmented information or length information) corresponding to the segmented data and the MAC headers (since L field and length are changed) may be updated (640). Accordingly, as compared with the LTE system, if it is assumed that the uplink grant, such as 630 and 645, is received at the same time, the next-generation mobile communication system can have a great gain at processing time, such as 635. This is because in the LTE system, the preprocessing operation is unable to be performed before the uplink grant is received, whereas in the next-generation mobile communication system, the preprocessing operation can be performed before the uplink grant is received. On the other hand, if needed, or if configured in the network, the RLC layer and the PDCP layer may use one common sequence number.

The preprocessing may be performed for each logical channel, and RLC PDUs preprocessed for each logical channel may be preprocessed again as MAC SDUs and MAC sub-headers by the MAC layer. Further, if the MAC layer receives the uplink grant 630, the terminal may multiplex the pre-generated MAC SDUs and MAC sub-headers by allocating the uplink grant for each logical channel. After the MAC layer receives the uplink grant from a base station, the terminal may perform logical channel prioritization (LCP), and may divide and give the uplink grant for each logical channel. Further, the terminal may configure one MAC PDU by multiplexing MAC SDUs and MAC sub-headers generated for each logical channel, and transfer the MAC PDU to a PHY layer. If the uplink grant allocated to each logical channel is not sufficient, segmentation may be requested with respect to the RLC layer. Accordingly, if the RLC layer performs the segmentation operation, segmentation information included in a header may be updated and transferred again to the MAC layer, and the MAC layer may update the corresponding MAC header.

As described above, the next-generation mobile communication system has a feature that data processing of the PDCP layer, RLC layer, and MAC layer can start even before the uplink grant is received.

[Data Preprocessing Operation in Terminal Connectivity]

According to embodiments of the disclosure, data preprocessing can be applied to the next-generation mobile communication system. The data preprocessing may be performed as large as the amount of data capable of being maximally transmitted in one transmission time interval (TTI) or once transmission. The data preprocessing can be performed as much as the maximum allowable UL grant or the largest UL grant. The time when the data preprocessing is performed may include one or more of the following cases:

1. The data preprocessing can be performed if the amount of the currently preprocessed data becomes smaller than the amount of the maximum allowable UL grant as described above.
2. The data preprocessing can be periodically performed based on a specific time.
3. The data preprocessing can be performed at a time when the MAC layer configures MAC PDUs using the uplink grant and transfers data to the PHY layer.
4. The data preprocessing can be performed after data is transmitted through the UL grant.
5. Data reception can be performed if an indicator to perform the data preprocessing is received from a lower layer.

At one of the above-described time points, the terminal can perform the data preprocessing. If necessary, the terminal can perform the data preprocessing in accordance with several time points as described above.

[Method for Performing Terminal Data Preprocessing in Multiple Connectivity]

Figure 7A:
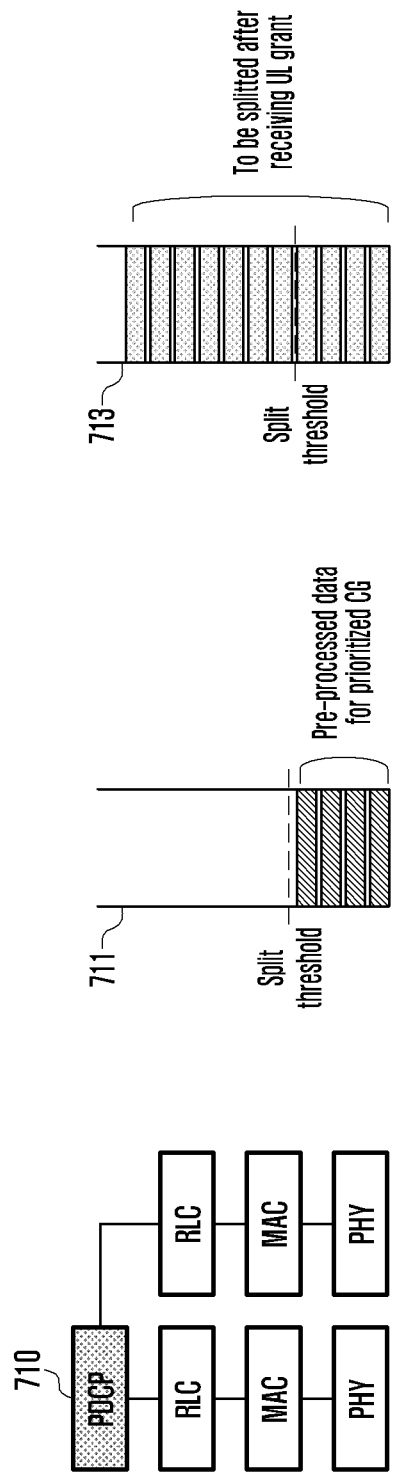
FIGS. 7A, 7B, and 7C are diagrams illustrating a method for performing a data preprocessing operation of a terminal in dual connectivity according to various embodiments of the disclosure.
Figure 7B:
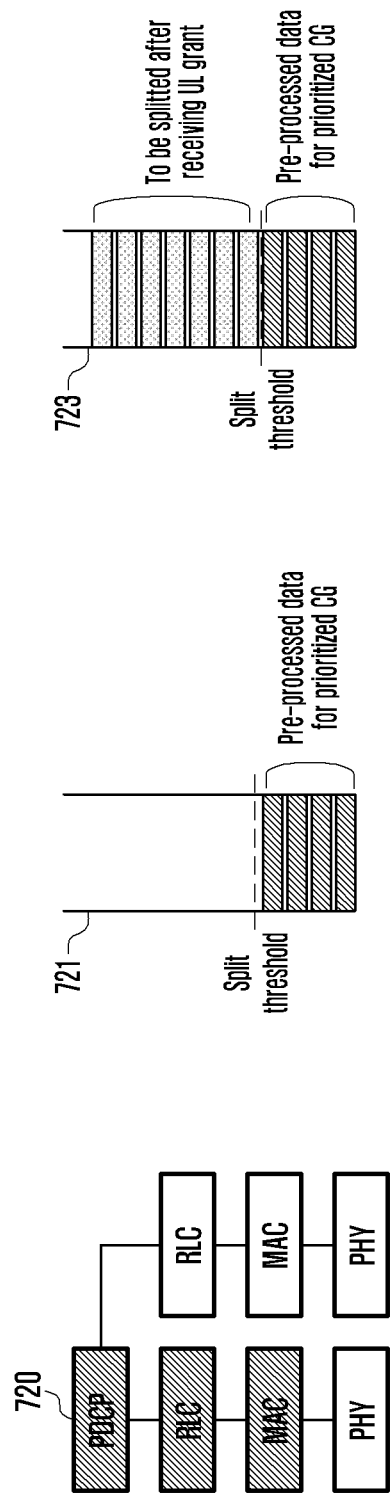
Figure 7C:
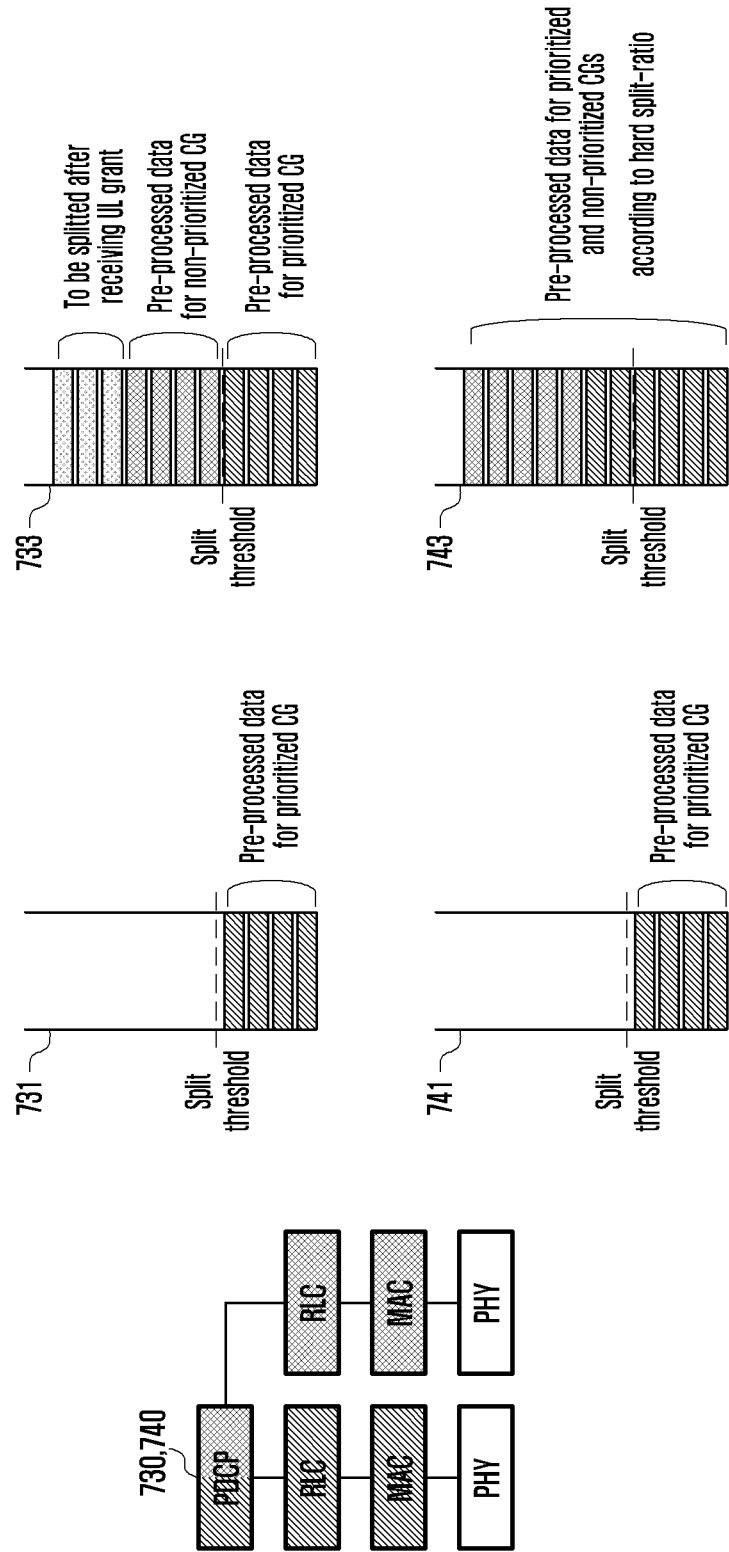

If uplink split bearers 710, 720, 730, and 740 are configured in a multiple or dual connectivity environment (if bearers for a master cell group and bearers for a secondary cell group are divided in a PDCP layer as shown in FIGS. 7A to 7C), the terminal should be able to predetermine whether a master cell group (MCG) or a secondary cell group (SCG) is to transmit data of a PDCP layer in order to perform the data preprocessing. Since it is required to allocate an RLC sequence number in the data preprocessing process, it should be predetermined what cell group is to perform transmission of the data of the PDCP layer in order to perform the data preprocessing. If it is not predetermined what cell group the data is to be sent to, the data preprocessing may be impossible (if partial preprocessing proposed below is used, the data preprocessing may become possible, and a great data preprocessing gain can be obtained). Since RLC layer devices corresponding to respective cell groups allocate independent RLC sequence numbers, it should be predetermined what cell group the PDCP data (PDCP PDUs) is to be sent to. Methods for pre-allocating PDCP layer data to master and secondary cell groups in the dual connectivity environment are as follows.

FIGS. 7A to 7C are diagrams illustrating a method for performing a data preprocessing operation of a terminal in dual connectivity according to various embodiments of the disclosure. Hereinafter, FIGS. 7A to 7B are commonly called FIG. 7.

Referring to FIG. 7, first allocation method (710): If the amount of data of the PDCP layer is smaller than a predetermined threshold value (in case of a state 711 in FIG. 7), the terminal does not pre-allocate the data of the PDCP layer to a master cell group and a secondary cell group. The data within the threshold value is preprocessed only in the master cell group (or secondary cell group or cell group preconfigured by the base station).

If the amount of data of the PDCP layer becomes larger than the threshold value (in case of a state of 713 in FIG. 7), the terminal does not perform the data preprocessing with respect to the data of which the amount becomes larger than the threshold value. The terminal performs buffer status report to the master cell group and the secondary cell group with respect to the current amount of data of the PDCP layer, and if the uplink grant is received with respect to each cell group, the terminal may allocate the PDCP layer data to the master cell group and the secondary cell group in accordance with the uplink grant, and may perform data processing to transmit the data. That is, the terminal may first process and transmit the data to the base station to which the UL grant is allocated. The threshold value may be allocated as a value capable of indicating a low data rate or small data, and may be configured when the network (or base station) performs RRC connection configuration.

2. The (1-1)-th allocation method (720): If the amount of data of the PDCP layer is smaller than the predetermined threshold value (in case of a state of 721 in FIG. 7), the terminal does not pre-allocate the data of the PDCP layer to the master cell group and the secondary cell group. Further, the data within the threshold value is preprocessed only in the master cell group (or secondary cell group or cell group preconfigured by the base station). For example, the terminal may perform data preprocessing of the data as large as the threshold value only with respect to the master cell group (or secondary cell group or cell group preconfigured by the base station), and may perform the buffer status report to the master cell group and the secondary cell group with respect to the data of which the amount is equal to or larger than the threshold value. If the uplink grant is received with respect to each cell group, the terminal may allocate the PDCP layer data to the master cell group and the secondary cell group in accordance with the uplink grant, and may perform data preprocessing to transmit the data (723). The threshold value may be allocated as a value capable of indicating a low data rate or small data, and may be configured when the network (or base station) performs RRC connection configuration.

3. The (1-2)-th allocation method (730): If the amount of data of the PDCP layer is smaller than a predetermined threshold value (in case of a state of 731 in FIG. 7), the terminal does not pre-allocate the data of the PDCP layer to the master cell group and the secondary cell group. The data within the threshold value is preprocessed only in the master cell group (or secondary cell group or cell group preconfigured by the base station).

If the amount of data of the PDCP layer becomes larger than the threshold value (in case of a state of 733 in FIG. 7), the terminal may preprocess the data in the master cell group and the secondary cell group. For example, the terminal may preprocess the data as large as the threshold value for the master cell group (or secondary cell group or cell group preconfigured by the base station) with respect to the data of which the amount becomes larger than the threshold value, and may preprocess the data with respect to the secondary cell group (or master cell group or cell group not preconfigured by the base station) as large as the size of the uplink grant that can be maximally allocated of the secondary cell group among the data of which the amount is equal to or larger than the threshold value. With respect to other remaining data, the terminal may perform buffer status report to the master cell group and the secondary cell group, and if the uplink grant is received with respect to each cell group, the terminal may allocate the PDCP layer data to the master cell group and the secondary cell group in accordance with the uplink grant, and may perform data processing to transmit the data. The threshold value may be allocated as a value capable of indicating a low data rate or small data, and may be configured when the network (or base station) performs RRC connection configuration.

4. Second allocation method (740): If the amount of data of the PDCP layer is smaller than the predetermined threshold value (in case of a state of 741 in FIG. 7), the terminal does not pre-allocate the data of the PDCP layer to the master cell group and the secondary cell group. The data within the threshold value is preprocessed only in the master cell group (or secondary cell group).

If the amount of data of the PDCP layer becomes larger than the threshold value (in case of a state of 743 in FIG. 7), the terminal may pre-allocate the current overall data of the PDCP layer to the master cell group and the secondary cell group in accordance with a specific split ratio configured by the network or base station (or with respect to the data as large as the threshold value, data preprocessing is performed for the master cell group, and with respect to the data exceeding the threshold value, data preprocessing is performed after the data is pre-allocated to the master cell group and the secondary cell group in accordance with the specific split ratio). With respect to the pre-allocated data, the terminal may perform the data preprocessing for the respective cell groups before the respective cell groups are allocated with the uplink grant. With respect to other remaining data, the terminal may perform buffer status report to the master cell group and the secondary cell group, and if the uplink grant is received with respect to each cell group, the terminal may allocate the PDCP layer data to the master cell group and the secondary cell group in accordance with the uplink grant, and may perform data processing to transmit the data. The threshold value may be configured as a value capable of indicating a low data rate or small data when RRC connection configuration is performed by the network (or base station), and the split ratio may be configured when the network (or base station) performs the RRC connection configuration in consideration of the network and base station resource situations.

In the disclosure, the terminal in the dual-connectivity environment can perform the data preprocessing by applying one of four methods as described above. By the above-described methods, the PDCP layer data can be used for the preprocessing by pre-allocating the PDCP layer data to the master cell group and/or secondary cell group.

A procedure in which the PDCP layer of the terminal determines the amount of data based on the threshold value and pre-allocates the data to the master cell group and the secondary cell group may start at one or a plurality of time points is described below:
1. When it is intended to perform the data preprocessing in a state where the amount of the currently preprocessed data becomes smaller than the amount of uplink grant capable of being maximally allocated
2. Periodically based on a specific time
3. At a time when the MAC layer configures the MAC PDUs using the uplink grant and transfers the data to the PHY layer
4. After transmitting the data to the UL grant
5. When an indicator for performing the data preprocessing is received from the lower layer and it is intended to perform the data preprocessing
6. Whenever new data is received in the PDCP layer
7. When an indicator to perform data allocation to the master cell group and the secondary cell group is received from the lower layer
8. When the amount of data becomes larger than a specific threshold value in the PDCP layer Whenever the amount of the PDCP layer data is compared with the threshold value, the amount of the PDCP layer data may be calculated by the following methods:
1. First calculation method: This method calculates the size of the overall data corresponding to the sum of the data amount of the PDCP data layer that is not transmitted and is not preprocessed, the data amount that is not transmitted and is preprocessed in the master cell group, and the data amount that is not transmitted and is preprocessed in the secondary cell group, and compares the calculated value with the threshold value.
2. Second calculation method: This method calculates the size of the data amount of the PDCP data layer that is not transmitted and is not preprocessed, and compares the calculated value with the threshold value.
3. Third calculation method: This method calculates the size of the data amount that is not transmitted and is newly received excluding the data calculated when being compared with the previous threshold value, and compares the calculated value with the threshold value.
4. Fourth calculation method: This method calculates the size of the overall data corresponding to the sum of the data amount that is not transmitted and is preprocessed in the master cell group and the data amount that is not transmitted and is preprocessed in the secondary cell group, and compares the calculated value with the threshold value.

Using one of the four methods as described above, the size of the PDCP layer data to be compared with the threshold value through the terminal in the dual-connectivity environment can be calculated.

The terminal in the dual-connectivity environment may make it a rule to allocate the successive PDCP sequence numbers so that the respective cell groups maximally have them when the data of the PDCP layer is pre-allocated to the master cell group and the secondary cell group. If the PDCP sequence numbers are not split to the respective cell groups, but are allocated to the groups of the successive PDCP sequence numbers, the processing time and burden occurring when the PDCP layer of the receiving side realigns the order of the PDCP sequence numbers can be reduced.

In the method for performing data preprocessing of the terminal in the dual-connectivity environment, the data preprocessing can be performed by applying the method for performing data preprocessing of the terminal in a single-connectivity environment to each cell group. When performing the data preprocessing in the respective cell groups, the terminal can perform the data preprocessing as large as the maximum transport block size, the size of the maximum allowable UL grant, or the size of the data maximally transmittable in one TTI. If the data preprocessing is performed as large as the above-described size, it is possible to obtain the maximum data preprocessing gain for the next data transmission. In the method for performing the data preprocessing of the terminal in the dual-connectivity environment, the threshold value or the specific split ratio can be configured from the base station to the terminal through an RRC message (RRCConnectionSetup or RRCConnection-Reconfiguration), or may be dynamically reconfigured through the RRC message (RRCConnectionReconfiguration). Further, in order to dynamically allocate the threshold value or the specific split ratio, the threshold value or the specific split ratio may be updated using a newly defined PDCP control PDU or MAC control element (CE).

In the method for performing the data preprocessing of the terminal in the dual-connectivity environment, it is necessary for the base station to configure the threshold value so that the threshold value becomes larger than the maximum transport block size of the master cell group, the size of the maximum allowable UL grant, or the data size maximally transmittable in one TTI. This is because it becomes possible to obtain the maximum data preprocessing gain for the next data transmission by configuring the threshold value so that it becomes larger than the maximum transport block size, the size of the maximum allowable UL grant, or the data size maximally transmittable in one TTI.

In the dual-connectivity environment as described above, the terminal may configure the PDCP layer data to send them to different cell groups through packet duplication, and this configuration may be activated or deactivated by the RRC message, or newly defined PDCP control PDU or MAC CE.

[Method for Implementing Terminal Data Preprocessing in Multiple Connectivity]

Figure 8A:
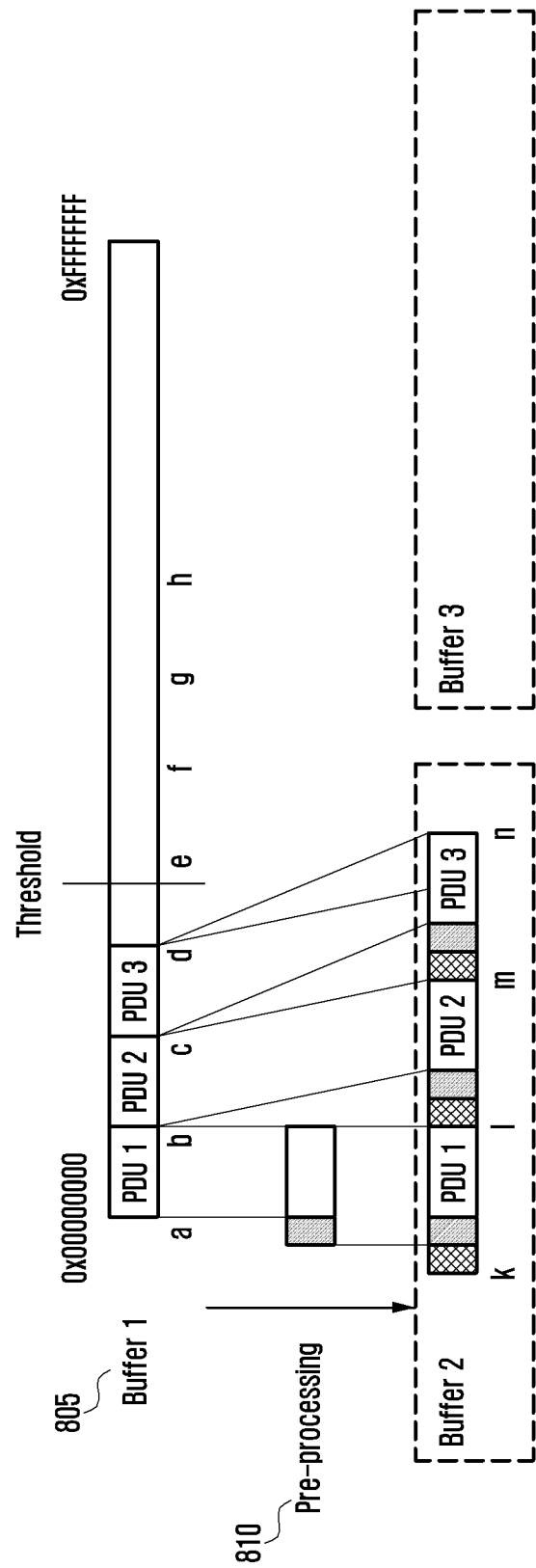
Figure 8B:
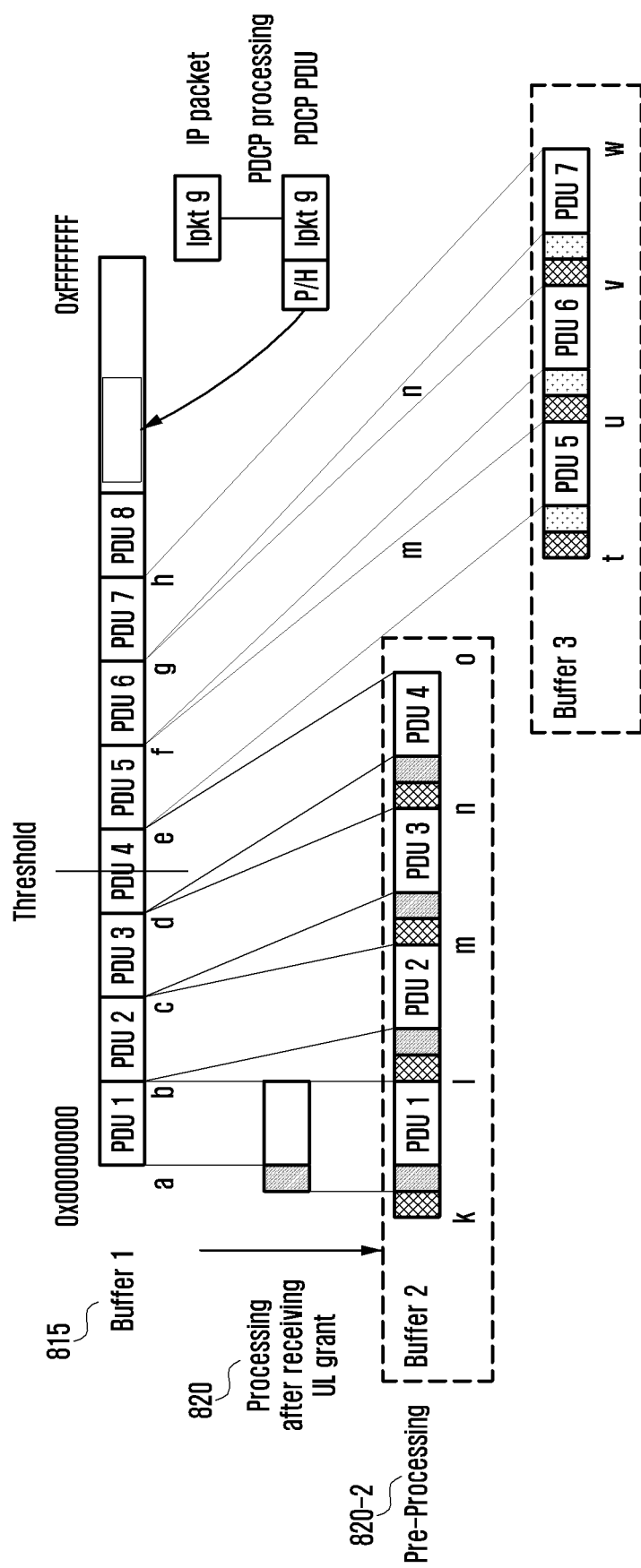

FIGS. 8A to 8C are diagrams illustrating a first embodiment for implementing a data preprocessing operation of a terminal in multiple connectivity according to various embodiments of the disclosure. Hereinafter, FIGS. 8A to 8C are commonly called FIG. 8.

Referring to FIG. 8A, in the first embodiment for implementing the data preprocessing operation of the terminal in the dual connectivity, it may be featured that the terminal has separate buffers for respective cell groups and separate mapping tables. The separate buffers may mean logically divided buffers, different buffers on memory addresses, buffers actually the same in hardware, but logically divided, or separate buffers divided in hardware. The first embodiment corresponds to a method for implementing the first allocation method capable of performing data preprocessing in the dual-connectivity environment.

If IP packets are received in the PDCP layer device, the terminal may configure and store PDCP PDUs in a first buffer (805). If a data amount of the first buffer is smaller than a predetermined threshold value (810), the terminal does not pre-allocate the data of the PDCP layer to the master cell group and the secondary cell group. Data within the threshold value is preprocessed only in the master cell group (or secondary cell group or cell group preconfigured by the base station).

If the amount of data of the PDCP layer becomes larger than the threshold value (815), the terminal does not perform the data preprocessing with respect to the corresponding data. The terminal performs buffer status report to the master cell group and the secondary cell group with respect to the current amount of data of the PDCP layer, and if the uplink grant is received with respect to each cell group, the terminal allocates the PDCP layer data to the master cell group and the secondary cell group in accordance with the received uplink grant. The terminal may perform data processing with respect to the data allocated to the respective cell groups, store the data in the buffers corresponding to the respective cell groups (second buffer 825 and third buffer 830), and perform data transmission (820). The terminal may first process and transmit the data to the base station (cell group) to which the UL grant is allocated. The threshold value may be allocated as a value that can indicate a low data rate or small data, and may be configured when RRC connection configuration is performed by the network (or base station).

As described above, separate mapping information for the respective cell groups may be configured as mapping tables 825 and 830. The respective mapping tables may be configured based on RLC sequence numbers (SNs) (may also be configured based on PDCP sequence numbers). The respective mapping tables may indicate a mapping relationship between memory addresses of the first and second buffers or the third buffer. In case of performing the segmentation operation, segmentation information (seg. Info) may be stored in the mapping tables, and in case of an RLC AM mode in which RLC ARQ function is applied, ACK/NACK information may be recorded in the mapping tables. Further, in addition to the mapping information of the memory addresses, mapping information between RLC sequence numbers and PDCP sequence numbers may be recorded by adding a PDCP sequence number field.

If an RLC device and a MAC device corresponding to respective cell groups perform the data preprocessing before receiving the uplink grant from the respective cell groups at operation 820 of the first embodiment (FIG. 8) for implementing the terminal data preprocessing in the dual connectivity (820-2), the (1-1)-th allocation method, the (1-2)-th allocation method, and the second allocation method, for making it possible to perform the data preprocessing in the dual-connectivity environment can be implemented. The preprocessing may be performed only with respect to a preconfigured cell group according to the (1-1)-th allocation method, the master cell group and the secondary cell group may perform the preprocessing based on the threshold value or an uplink amount that is transmittable at a time according to the (1-2)-th allocation method, or the master cell group and the secondary cell group may perform the preprocessing in accordance with a preconfigured ratio according to the second allocation method. The preprocessed data may be managed through the mapping tables as described above at operations 825 and 830.

Figure 9A:
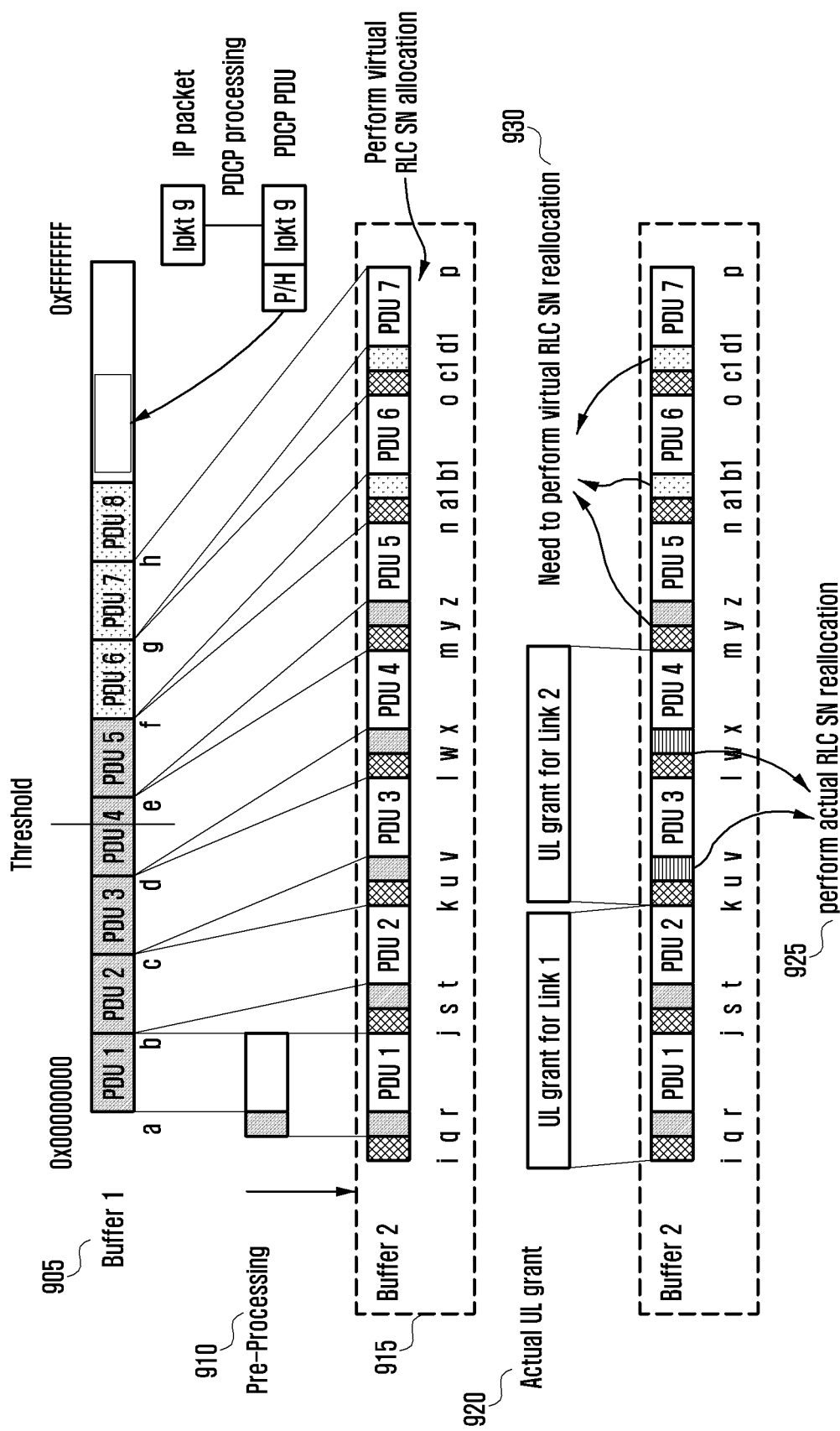

FIGS. 9A and 9B are diagrams illustrating a second embodiment for implementing a data preprocessing operation of a terminal in multiple connectivity according to various embodiments of the disclosure. Hereinafter, FIGS. 9A and 9B are commonly called FIG. 9.

Referring to FIG. 9A, in the second embodiment for implementing the data preprocessing operation of the terminal in the dual connectivity, it may be featured that the terminal does not have separate buffers for respective cell groups, but has one integrated buffer, and an integrated mapping table. The integrated buffer may mean a logically integrated buffer, different buffers on memory addresses, buffers actually different in hardware, but logically integrated, or an integrated buffer in hardware. The second embodiment corresponds to a method for implementing the first allocation method capable of making it possible to perform data preprocessing in the dual-connectivity environment, the (1-1)-th allocation method, the (1-2)-th allocation method, and the second allocation method. In particular, the second embodiment may be more suitable in implementing the second allocation method.

If the amount of data of the PDCP layer is smaller than a predetermined threshold value, the terminal does not pre-allocate the data of the PDCP layer to the master cell group and the secondary cell group. The data within the threshold value is preprocessed only in the master cell group (or secondary cell group or predesignated cell group). If the amount of data of the PDCP layer is smaller than the predetermined threshold value, the method as in the first embodiment can be implemented.

If the amount of data of the PDCP layer becomes larger than the threshold value (905), the terminal may pre-allocate the current overall data of the PDCP layer to the master cell group and the secondary cell group in accordance with a specific split ratio configured by the network or base station (or with respect to the data as large as the threshold value, data preprocessing is performed for the master cell group, and with respect to the data exceeding the threshold value, data preprocessing is performed after the data is pre-allocated to the master cell group and the secondary cell group in accordance with the specific split ratio, or with respect to the overall data, data preprocessing is performed as large as the amount of the maximally receivable UL grant with respect to the respective cell groups) (910). With respect to the data predetermined to be sent to the respective cell groups, the terminal may perform the data preprocessing for the respective cell groups before the respective cell groups are allocated with the uplink grant. An RLC sequence number may be allocated, an RLC header and a MAC header may be preconfigured, and the preprocessed data for the respective cell groups may be stored in the second buffer (915). In this case, the RLC sequence number may be a virtual RLC sequence number. The RLC sequence number may be an RLC sequence number temporarily designated as large as the maximum amount of UL grant of the respective cell groups. Accordingly, if the UL grant is actually received for the respective cell groups, the RLC sequence number may be reallocated in accordance with the received UL grant. If the pre-allocated virtual RLC sequence number well coincides with the actually allocated UL grant, it is not necessary to reallocate the RLC sequence number. For example, if the amount of UL grant allocated to the respective cell groups is smaller than the amount preprocessed in the respective cell groups, it may be necessary to reallocate the RLC sequence number.

If the UL grant is actually received from the respective cell groups after the data preprocessing is performed for the respective cell groups (920), the terminal may compare the actually received UL grant with the amount of the preprocessed data, and may reallocate the virtual RLC sequence number so that data can be successively transmitted to the received UL grant (925). Accordingly, the RLC sequence number can be reallocated to a part of the preprocessed data, and the data can be transmitted to match the size of the UL grant. If needed, in case where the size of the grant does not match the size of the preprocessed data, a segmentation operation may be performed.

In this case, with respect to the remaining preprocessed data after the preprocessed data is transmitted to the respective cell groups, virtual RLC sequence numbers may be reallocated. The virtual RLC sequence numbers mean reallocation of the RLC sequence numbers with respect to the next UL grant (930).

The above-described procedure may be repeatedly performed after the next UL grant is received from the respective cell groups.

In order to implement the second embodiment, mapping tables 935 and 940 for managing integrated mapping information may be configured. The respective mapping tables may be configured based on the RLC sequence numbers (SNs) (may also be configured based on PDCP sequence numbers). The respective mapping tables may indicate a mapping relationship between memory addresses of the first and second buffers, and may store segmentation information if the segmentation operation is performed. In case of performing the segmentation operation, segmentation information may be stored in the mapping tables, and in case of an RLC AM mode in which RLC ARQ function is applied, ACK/NACK information may be recorded in the mapping tables. In addition to the mapping information of the memory addresses, mapping information between RLC sequence numbers and PDCP sequence numbers may be recorded by adding a PDCP sequence number field. A new field indicating locations of the respective RLC sequence numbers or memory addresses may be added to the mapping table, and since the integrated mapping table is used, a link field for indicating the respective cell groups may be added. For example, in the link field, "0" may indicate the master cell group, and "1" may indicate the secondary cell group. The RLC sequence numbers for the respective cell groups are managed independently and allocated independently and successively.

As described above, the terminal may allocate virtual RLC sequence numbers and may implement the mapping table 935 before it receives the UL grant from the respective cell groups. Whenever the UL grant is received from the respective cell groups, the terminal may update the virtual RLC sequence number as in 940. The terminal may reallocate the actual RLC sequence number to match the size of the UL grant, and may transmit data to the respective cell groups. After transmitting the data corresponding to the UL grant to the respective cell groups, the terminal may expect the next UL grant and may allocate a new virtual RLC sequence number with respect to the remaining data. To expect the next UL grant means to consider the specific split ratio corresponding to the respective cell groups configured by the base station or the amount of UL grant that can be maximally received by the respective cell groups.

The reason why reallocation of the RLC sequence number is necessary is that performance deterioration may occur if mismatch occurs between the size of the preprocessed data for the respective cell groups and the size of data actually UL-granted in the respective cell groups. For example, if actual UL grant of 50 kilobytes comes to the first cell group and actual UL grant of 150 kilobytes comes to the second cell group in a state where, for example, data of 100 kilobytes has been preprocessed for the first cell group and data of 100 kilobytes has been preprocessed for the second cell group, delay may occur in the receiving-end PDCP device due to the 50 kilobytes that have not been sent to the first cell group. A PDCP sequence number gap may exist between the data of 50 kilobytes received from the first cell group and the data of 50 kilobytes received from the second cell group, and in order to successively transfer them to an upper layer, it is required to wait for the data of 50 kilobytes that has not yet been received, and this may cause the delay to occur. Further, if the UL grant of 150 kilobytes comes in a state where only 100 kilobytes have been made in the second cell group, unnecessary padding should be made, and thus resource waste may occur.

For example, at 935, virtual RLC sequence numbers 1, 2, 3, 4, 5 are generated for link 0 and virtual RLC sequence numbers 1, 2 are generated for link 1, but as the result of UL grant allocation, only the resource corresponding to the uplink RLC sequence numbers 1, 2 may be allocated for link 0. In this case, update of the RLC sequence numbers is necessary with respect to the previously generated virtual RLC sequence numbers 3 or more and the RLC SN for link 1. If the amount of resource enough to process RLC SNs 3, 4 at 935 is allocated through link 1, the data processed as link 0, RLC SNs 3, 4 at 935 may be updated to link 1, RLC SNs 1, 2 as at 940. The preprocessed data to which the resource is unable to be allocated (data corresponding to link 0 and RLC SN of 5 at 935 and data corresponding to link 1 and RLC SNs of 1, 2) requires update (or reallocation) of the RLC sequence numbers.

Although the second embodiment has been described as being exemplified as the second allocation method, it can be applied even to the first allocation method, the (1-1)-th allocation method, and the (1-2)-th allocation method. According to the second embodiment, the integrated buffer is used, the virtual RLC SNs are allocated to the preprocessed data, and the RLC SNs are updated or reallocated after the UL grant is received. For data determination for the preprocessing, the first allocation method, the (1-1)-th allocation method, the (1-2)-th allocation method, and the second allocation method can be applied in all.

FIGS. 10A to 10C are diagrams illustrating a third embodiment for implementing a data preprocessing operation of a terminal in multiple connectivity according to various embodiments of the disclosure. Hereinafter, FIGS. 10A to 10C are commonly called FIG. 10.

Referring to FIG. 10A, in the third embodiment for implementing the data preprocessing operation of the terminal in the dual connectivity, it may be featured that the terminal does not have separate buffers for respective cell groups, but has one integrated buffer, and an integrated mapping table. The integrated buffer may mean a logically integrated buffer, different buffers on memory addresses, buffers actually different in hardware, but logically integrated, or an integrated buffer in hardware. The third embodiment corresponds to a method for implementing the first allocation method capable of making it possible to perform data preprocessing in the dual-connectivity environment, the (1-1)-th allocation method, the (1-2)-th allocation method, and the second allocation method.

If the amount of data of the PDCP layer is smaller than a predetermined threshold value, the terminal does not preallocate the data of the PDCP layer to the master cell group and the secondary cell group. The data within the threshold value is preprocessed only in the master cell group (or secondary cell group or predesignated cell group). If the amount of data of the PDCP layer is smaller than the predetermined threshold value, the method as in the first embodiment can be implemented.

The third embodiment proposes a data partial preprocessing method. The data partial preprocessing method means to perform the same procedure as the data preprocessing method, but to empty positions to which RLC sequence numbers are to be allocated without allocating the RLC sequence numbers and to perform no processing (this means to empty positions on a memory). The data partial preprocessing method means to perform data preprocessing with respect to the remaining RLC header field and MAC header. According to the third embodiment, the RLC sequence numbers are not reallocated several times as in the second embodiment, and thus terminal processing power can be saved, and burden can be reduced. Memory addresses of the respective RLC sequence numbers are stored, and the RLC sequence numbers can be allocated using the stored memory addresses of the RLC sequence numbers as large as the size of the data to be transmitted corresponding to the UL grant whenever the UL grant is received from the respective cell groups. Accordingly, in the third embodiment, the data partial preprocessing can be performed in the same manner as the time points or conditions for performing the data preprocessing procedure as described above. Whenever the UL grant is received from the respective cell groups, the RLC sequence numbers are allocated, and the data transmission can be performed.

The data partial preprocessing is a method that can be valuably applied even in a UL split bearer of the terminal. Further, the method can be valuably applied even to a DL split bearer of the base station.

Even if the amount of data of the PDCP layer is smaller than the predetermined threshold value, the data partial preprocessing method as described above can be applied.

If the amount of data of the PDCP layer becomes larger than the threshold value (1005), the terminal may preprocess the current overall data of the PDCP layer. For example, the terminal may perform the data partial preprocessing as large as the sum of the maximally receivable UL grant amounts with respect to the cell groups (1010). In the third embodiment, during the preprocessing, the terminal may not allocate the RLC sequence numbers, preconfigure RLC headers and MAC headers, and store partially preprocessed data for the respective cell groups in the second buffer (1015). If the UL grant is actually received for the respective cell groups, the terminal may allocate the RLC sequence numbers in accordance with the received UL grant.

If the UL grant is actually received from the respective cell groups after the data partial preprocessing is performed as described above (1020), the terminal may compare the actually received UL grant with the amount of the partially preprocessed data, and may allocate the RLC sequence numbers so that data can be successively transmitted to the received UL grant (1025). Accordingly, the RLC sequence numbers can be allocated to a part of the partially preprocessed data, and the data can be transmitted to match the size of the UL grant. If needed, in case where the size of the grant does not match the size of the preprocessed data, a segmentation operation may be performed.

In this case, with respect to the remaining partially preprocessed data after the partially preprocessed data is transmitted to the respective cell groups, RLC sequence numbers are allocated after the next UL grant is received from the respective cell groups, and data transmission is performed. The above-described procedure may be repeatedly performed.

In order to implement the third embodiment, mapping tables 1030 and 1035 for managing integrated mapping information may be configured. The respective mapping tables may be configured based on the RLC sequence numbers (SNs). The mapping tables may also be configured based on PDCP sequence numbers. The respective mapping tables may indicate a mapping relationship between memory addresses of the first and second buffers, and segmentation information may be stored in the mapping tables if the segmentation operation is performed. In case of an RLC AM mode in which an RLC ARQ function is applied, ACK/NACK information may be recorded in the mapping tables. Further, in addition to the mapping information of the memory addresses, mapping information between RLC sequence numbers and PDCP sequence numbers may be recorded by adding a PDCP sequence number field. A new field indicating locations of the respective RLC sequence numbers or memory addresses may be added to the mapping table, and since the integrated mapping table is used, a link field for indicating the respective cell groups may be added. The RLC sequence numbers for the respective cell groups are managed independently and allocated independently and successively.

As described above, the terminal may not allocate the RLC sequence numbers and may implement the mapping table 1030 before it receives the UL grant from the respective cell groups. Whenever the UL grant is received from the respective cell groups, the terminal may update the RLC sequence numbers (1035). The terminal may allocate the RLC sequence numbers to match the size of the UL grant, and may transmit data to the respective cell groups. Whenever the next UL grant is received with respect to the remaining data after the data corresponding to the UL grant is transmitted to the respective cell groups, the terminal may allocate the RLC sequence numbers. For example, although data corresponding to PDCP SNs 1 to 7 has been preprocessed at 1030, the terminal does not allocate the RLC SNs.

The terminal may not allocate even a link field. If the UL grant is allocated, the terminal may allocate the RLC SNs and may determine the link. For example, it may be assumed that a resource for transmitting PDCP SNs 1, 2 is allocated with respect to link 0, and a resource for transmitting PDCN SNs 3, 4 is allocated with respect to link 1. In this case, like 935, the preprocessed data corresponding to PDCP SNs 1, 2 may be allocated with link 0, RLC SNs 1, 2, and the preprocessed data corresponding to PDCP SNs 3, 4 may be allocated with link 1, RLC SNs 1, 2. If the UL grant is allocated later, the preprocessed data corresponding to PDCP SNs 5, 6, 7 may be allocated with the RLC SNs.

According to the third embodiment, the integrated buffer is used, the RLC SNs are not allocated through the partial preprocessing, and the RLC SNs are allocated after the UL grant is received. For data determination for the preprocessing, the first allocation method, the (1-1)-th allocation method, the (1-2)-th allocation method, and the second allocation method according to the disclosure can be applied in all.

Figure 11:
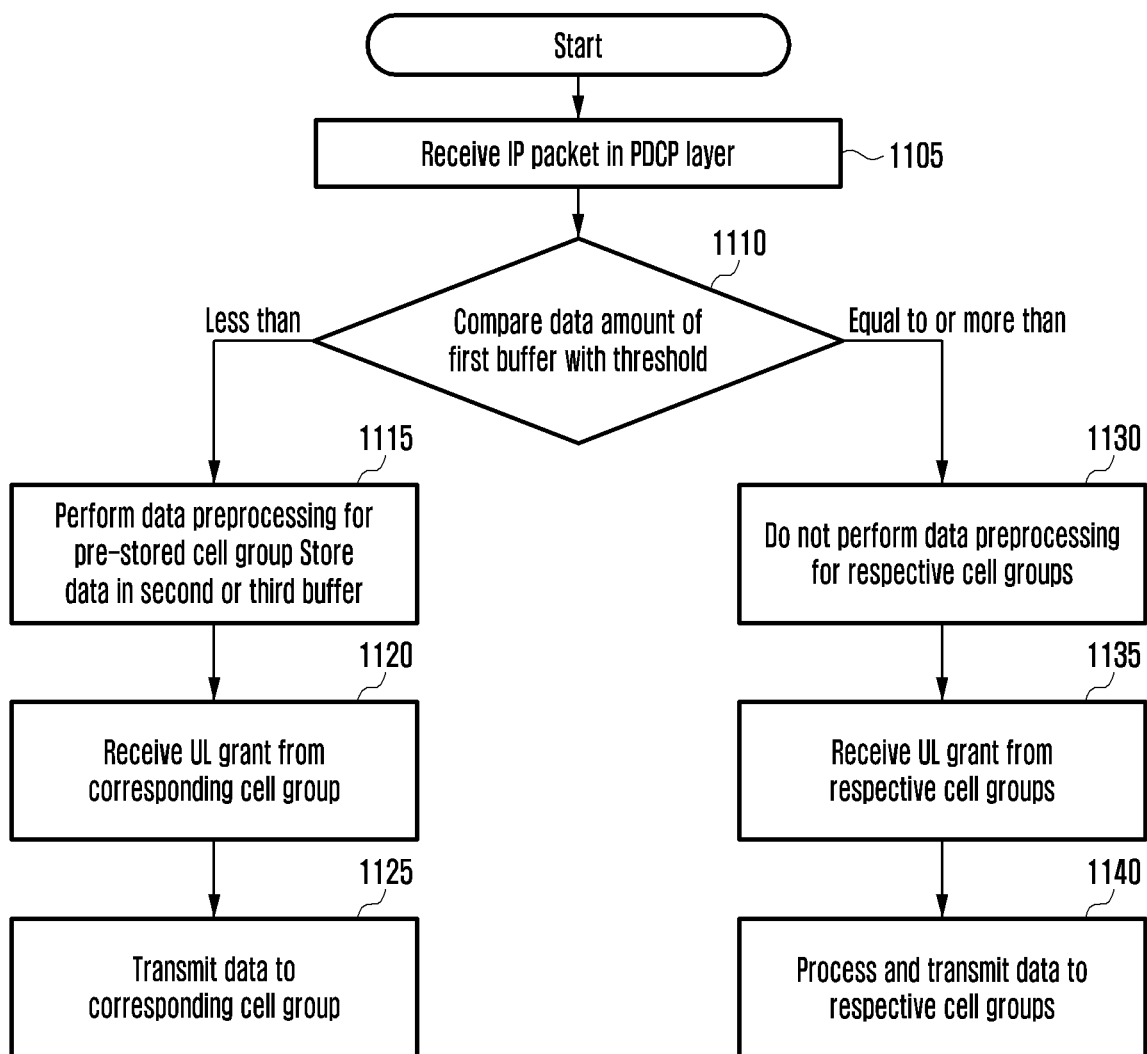
FIG. 11 is a diagram illustrating a terminal operation of a first embodiment for implementing a data preprocessing operation of a terminal in multiple connectivity according to an embodiment of the disclosure.

FIG. 11 is a diagram illustrating a terminal operation of a first embodiment for implementing a data preprocessing operation of a terminal in multiple connectivity according to an embodiment of the disclosure.

Referring to FIG. 11, if IP packets are received in a PDCP layer device, the terminal may configure and store PDCP PDUs in a first buffer in operation 1105.

The terminal compares the amount of the stored data with a threshold value in operation 1110. The time point when the data amount is compared with the threshold value and a method for calculating the amount of data to be compared with the threshold value may follow the above-described contents of the disclosure. If the amount of the stored data is smaller than the threshold value, operation 1115 is performed, whereas if the amount of the stored data is larger than the threshold value, operation 1130 is performed.

If the amount of data in the first buffer is smaller than the predetermined threshold value in operation 1115, the terminal does not pre-allocate the data of the PDCP layer to the master cell group and the secondary cell group. The data within the threshold value may be preprocessed only in the master cell group, secondary cell group, or cell group preconfigured by the base station. The terminal stores the preprocessed data in the second or third buffer.

The terminal receives the UL grant for the corresponding cell group in operation 1120. The terminal may transmit the preprocessed data to the corresponding cell group using the received UL grant in operation 1125.

If the amount of data of the PDCP layer becomes larger than the threshold value, then in operation 1130, the terminal does not preprocess the corresponding data. The terminal performs buffer status report to the master cell group and the secondary cell group with respect to the current amount of data of the PDCP layer.

If the UL grant is received with respect to the respective cell groups in operation 1135), the terminal allocates the data of the PDCP layer to the master cell group and the secondary cell group in accordance with the UL grant, performs data processing, and stores the data in the buffer (second buffer or third buffer) corresponding to the cell group. The terminal may transmit the processed data based on the received UL grant in operation 1140. The terminal may first process and transmit the data to the base station to which the UL grant is first allocated.

If an RLC device and a MAC device corresponding to respective cell groups perform the data preprocessing before receiving the uplink grant from the respective cell groups at terminal operation 1130 of the first embodiment for implementing the terminal data preprocessing in the dual connectivity, the (1-1)-th allocation method, the (1-2)-th allocation method, and the second allocation method, for making it possible to perform the data preprocessing in the dual-connectivity environment can be implemented. Instead of performing no preprocessing at operation 1130, the data allocated to the respective cell groups may be preprocessed in accordance with the (1-1)-th allocation method, the (1-2)-th allocation method, or the second method, and operation 1135 and subsequent operations may be applied with respect to the non-preprocessed data.

Figure 12:
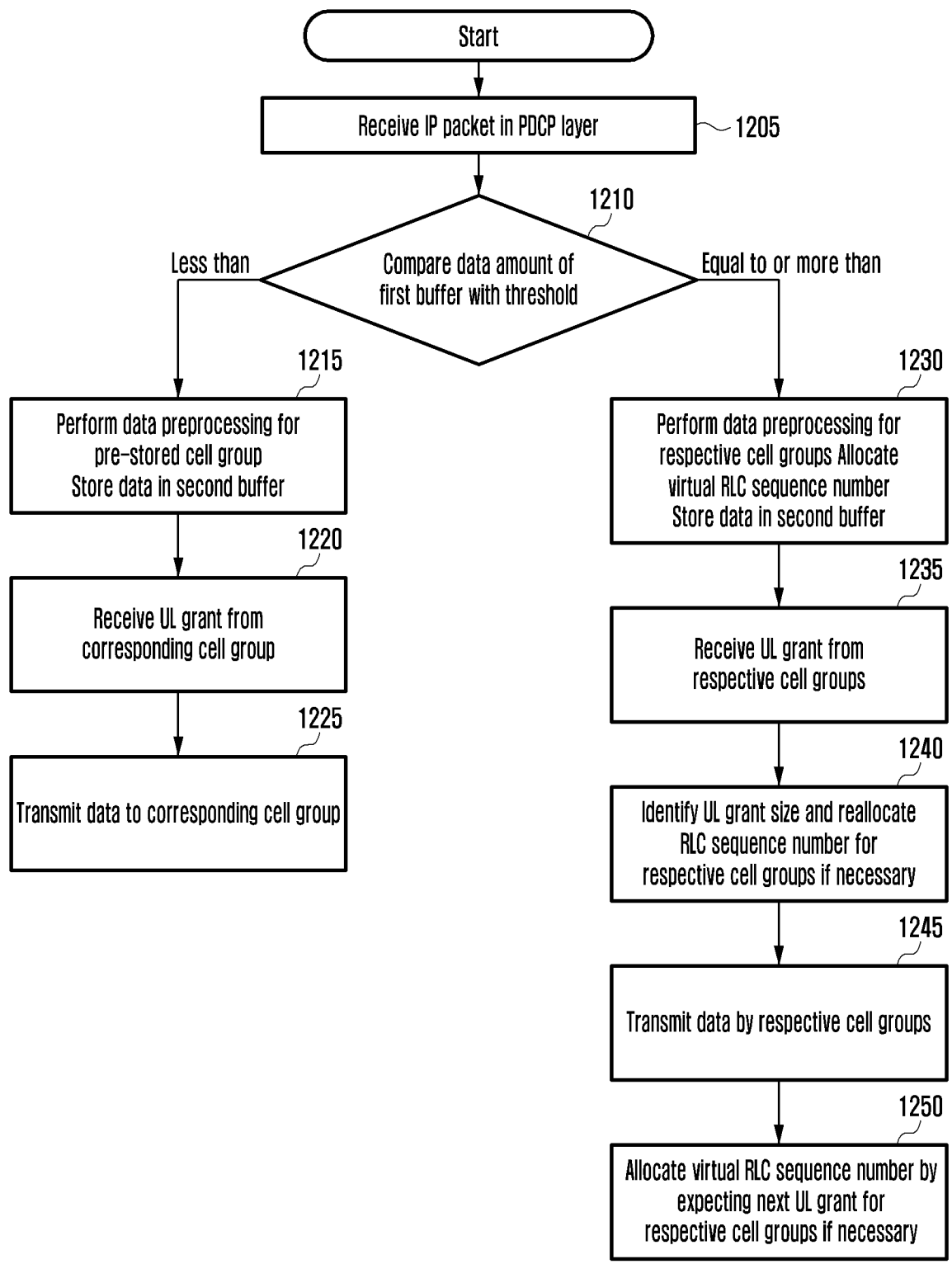
FIG. 12 is a diagram illustrating a terminal operation of a second embodiment for implementing a data preprocessing operation of a terminal in multiple connectivity according to an embodiment of the disclosure.

FIG. 12 is a diagram illustrating a terminal operation of a second embodiment for implementing a data preprocessing operation of a terminal in multiple connectivity according to an embodiment of the disclosure.

Referring to FIG. 12, if IP packets are received in a PDCP layer device, the terminal may configure and store PDCP PDUs in a first buffer in operation 1205.

The terminal compares the amount of the stored data with a threshold value in operation 1210. The time point when the data amount is compared with the threshold value and a method for calculating the amount of data to be compared with the threshold value may follow the above-described contents of the disclosure. If the amount of the stored data is smaller than the threshold value, operation 1215 is performed, whereas if the amount of the stored data is larger than the threshold value, operation 1230 is performed.

If the amount of data of the PDCP layer is smaller than the predetermined threshold value, the terminal does not pre-allocate the data of the PDCP layer to the master cell group and the secondary cell group. The data within the threshold value may be preprocessed only in the master cell group, secondary cell group, or predesignated cell group. The terminal may store the preprocessed data in the second buffer in operation 1215.

The terminal receives the UL grant for the corresponding cell group in operation 1220. The terminal may transmit the preprocessed data to the corresponding cell group using the received UL grant in operation 1225.

If the amount of data of the PDCP layer is smaller than the predetermined threshold value, the same method as that according to the first embodiment may be performed, and an integrated buffer rather than independent buffers may be used in a different manner from that according to the first embodiment.

If the amount of data of the PDCP layer becomes larger than the threshold value, the respective cell groups may preprocess the data, and may store the preprocessed data in the second buffer through allocation of virtual RLC sequence numbers in operation 1230. For example, the terminal may pre-allocate the current overall data of the PDCP layer to the master cell group and the secondary cell group in accordance with a specific split ratio configured by the network or base station (or with respect to the data as large as the threshold value, data preprocessing is performed for the master cell group, and with respect to the data exceeding the threshold value, data preprocessing is performed after the data is pre-allocated to the master cell group and the secondary cell group in accordance with the specific split ratio. With respect to the overall data, the terminal may perform the data preprocessing for the respective cell groups as large as the maximally receivable amount of UL grant) in operation 1230.

With respect to the data predetermined to be sent to the respective cell groups in the above-described method, the terminal may perform data preprocessing with respect to the cell groups before the respective cell groups are allocated with the uplink grant. An RLC sequence number may be allocated, an RLC header and a MAC header may be preconfigured, and the preprocessed data for the respective cell groups may be stored in the second buffer. In this case, the RLC sequence number may be a virtual RLC sequence number. The RLC sequence number may be an RLC sequence number temporarily designated in accordance with the ratio configured by the network or as large as the maximum amount of UL grant of the respective cell groups.

The terminal may receive the UL grant for the respective cell groups in operation 1235. If the terminal receives the UL grant for the respective cell groups, the RLC sequence number may be reallocated in accordance with the received UL grant in operation 1240. If the pre-allocated virtual RLC sequence number well coincides with the actually allocated UL grant, it is not necessary to reallocate the RLC sequence number.

If the UL grant is actually received from the respective cell groups after the data preprocessing for the respective cell groups is performed, the terminal may compare the actually received UL grant with the amount of the preprocessed data, and may reallocate the virtual RLC sequence number so that data can be successively transmitted to the received UL grant in operation 1240.

The RLC sequence number can be reallocated to a part of the preprocessed data, and the data can be transmitted to match the size of the UL grant in operation 1245. If needed, in case where the size of the grant does not match the size of the preprocessed data, a segmentation operation may be performed.

In this case, the UL grant for the respective cell groups may arrive at different times. Accordingly, the RLC sequence number may be reallocated in order to first transmit the data with respect to the cell group corresponding to the first arrived UL grant. In order to first transmit the preprocessed data to the secondary cell group corresponding to the first arrived UL grant with respect to the master cell group, the RLC sequence number may be reallocated and recorded in the mapping table (cell group indication (link) change and RLC sequence number update).

In this case, with respect to the remaining preprocessed data after the preprocessed data is transmitted to the respective cell groups, virtual RLC sequence numbers may be reallocated. The virtual RLC sequence numbers mean reallocation of the RLC sequence number with respect to the next UL grant in operation 1250.

Although the second allocation method according to an embodiment of FIG. 12 has been described as an example of the terminal operation, the embodiment of FIG. 12 can be applied even to the first allocation method, the (1-1)-th allocation method, and the (1-2)-th allocation method. According to the second embodiment, the integrated buffer is used, the virtual RLC sequence numbers are allocated to the preprocessed data, and the RLC sequence numbers are updated or reallocated after the UL grant is received. For data determination for the preprocessing, the first allocation method, the (1-1)-th allocation method, the (1-2)-th allocation method, and the second allocation method can be applied in all.

Figure 13:
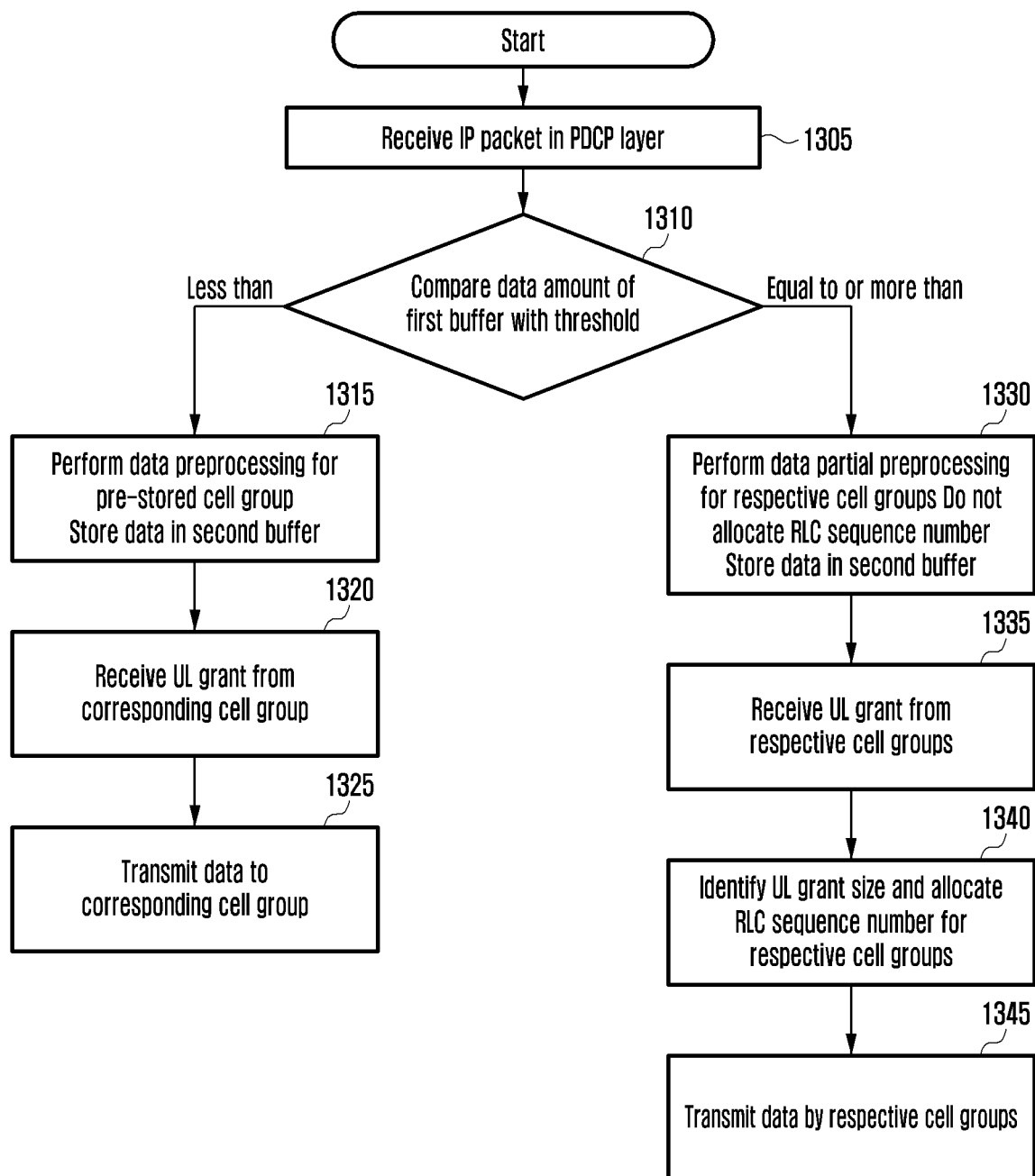
FIG. 13 is a diagram illustrating a terminal operation of a third embodiment for implementing a data preprocessing operation of a terminal in multiple connectivity according to an embodiment of the disclosure.

FIG. 13 is a diagram illustrating a terminal operation of a third embodiment for implementing a data preprocessing operation of a terminal in multiple connectivity according to an embodiment of the disclosure.

Referring to FIG. 13, in the third embodiment for implementing the data preprocessing operation of the terminal in the dual connectivity, it may be featured that the terminal does not have separate buffers for respective cell groups, but has one integrated buffer, and an integrated mapping table.

If IP packets are received in a PDCP layer device, the terminal may configure and store PDCP PDUs in a first buffer in operation 1305.

The terminal compares the amount of the stored data with a threshold value in operation 1310. The time point when the data amount is compared with the threshold value and a method for calculating the amount of data to be compared with the threshold value may follow the above-described contents of the disclosure. If the amount of the stored data is smaller than the threshold value, operation 1315 is performed, whereas if the amount of the stored data is larger than the threshold value, operation 1330 is performed.

If the amount of data of the PDCP layer is smaller than the predetermined threshold value, the terminal does not pre-allocate the data of the PDCP layer to the master cell group and the secondary cell group. The data within the threshold value may be preprocessed only in the master cell group (or secondary cell group or predesignated cell group). The terminal may store the preprocessed data in the second buffer in operation 1315.

The terminal receives the UL grant for the corresponding cell group in operation 1320. The terminal may transmit the preprocessed data to the corresponding cell group using the received UL grant in operation 1325.

If the amount of data of the PDCP layer is smaller than the predetermined threshold value, the same method as that according to the first embodiment may be performed, and an integrated buffer rather than independent buffers may be used in a different manner from that according to the first embodiment.

The third embodiment proposes a data partial preprocessing method. The data partial preprocessing method means to perform the same procedure as the data preprocessing method, but to empty positions to which RLC sequence numbers are to be allocated without allocating the RLC sequence numbers and to perform no processing (this means to empty positions on a memory). The data partial preprocessing method means to perform data preprocessing with respect to the remaining RLC header field and MAC header. According to the third embodiment, the RLC sequence numbers are not reallocated several times as in the second embodiment, and thus terminal processing power can be saved, and burden can be reduced. Memory addresses of the respective RLC sequence numbers are stored, and the RLC sequence numbers can be allocated using the stored memory addresses of the RLC sequence numbers as large as the size of the data to be transmitted corresponding to the UL grant whenever the UL grant is received from the respective cell groups. Accordingly, in the third embodiment, the data partial preprocessing can be performed in the same manner as the time points or conditions for performing the data preprocessing procedure as described above. Further, whenever the UL grant is received from the respective cell groups, the RLC sequence numbers are allocated, and the data transmission can be performed.

Even if the amount of data of the PDCP layer is smaller than the predetermined threshold value, the data partial preprocessing method as described above can be applied.

If the amount of data of the PDCP layer becomes larger than the threshold value, the respective cell groups may preprocess the data. However, since the partial preprocessing is performed, the RLC sequence number may not be allocated (1330). For example, the terminal may perform the data partial preprocessing as large as the maximally receivable amount of UL grant for the respective cell groups with respect to the current overall data of the PDCP layer in operation 1330. The terminal may not have allocated the RLC sequence number, preconfigure the RLC header and the MAC header, and store partially preprocessed data for the respective cell groups in the second buffer. Accordingly, if the UL grant is actually received for the respective cell groups, the RLC sequence number may be allocated in accordance with the received UL grant.

The terminal may receive the UL grant for the respective cell groups in operation 1335. If the terminal actually receives the UL grant from the respective cell groups after the data partial preprocessing is performed, the terminal may compare the actually received UL grant with the amount of partially preprocessed data, and may allocate the RLC sequence numbers so that the data can be successively transmitted to the received UL grant in operation 1340.

The terminal may allocate the RLC sequence number with respect to a part of the partially preprocessed data, and may transmit the data to match the size of the UL grant in operation 1345. If needed, in case where the size of the grant does not match the size of the preprocessed data, a segmentation operation may be performed.

In this case, with respect to the remaining partially preprocessed data after the partially preprocessed data is transmitted to the respective cell groups, RLC sequence numbers are allocated after the next UL grant is received from the respective cell groups, and data transmission is performed. The above-described procedure may be repeatedly performed.

In this case, the UL grant for the respective cell groups may arrive at different times. Accordingly, in order to first transmit the data with respect to the cell group corresponding to the first arrived UL grant, the RLC sequence number may be first allocated, and the data transmission may be performed.

The dual-connectivity technology as described above in the disclosure may be extendedly applied even to a multi-connectivity environment in which the terminal is connected to three or four base stations.

As a fourth embodiment of the disclosure, if it is determined that a specific split ratio predesignated by the network well matches the ratio of UL grant allocated by the respective cell groups in a state where the terminal performs the data partial preprocessing method by applying the third embodiment, that is, if they well match each other over a specific number of times or for a specific period, the terminal may apply the second embodiment. If it is determined that they do not well match each other, the terminal may apply the third embodiment again. That is, the above-described embodiments may be used in combination.

In the third embodiment proposed according to the disclosure, the data partial preprocessing method may be extended to not only non-allocation of the RLC sequence numbers but also non-allocation of the PDCP sequence numbers. Positions of the PDCP sequence numbers may be emptied (memory spaces are emptied), and may not be allocated, but may be allocated later. After a specific time elapses, for example, if a specific timer expires or for every specific period, the PDCP sequence number may be allocated with respect to the currently existing IP packet data. When the data partial preprocessing method is performed, the PDCP sequence number and the RLC sequence number are not allocated, but are emptied, and if the UL grant is received from the respective cell groups after data preprocessing is performed with respect to the PDCP header, RLC header, and MAC sub-header, the data can be transmitted by allocating the PDCP sequence number and the RLC sequence number to match the size of the UL grant. In this case, it is necessary to add a field for memory addresses of PDCP sequence numbers to mapping table information.

In the above-described embodiments, a field indicating whether the PDCP sequence number or the RLC sequence number is allocated to the mapping table may be necessary.

In the third embodiment, non-allocation of the RLC sequence number may be non-allocation of the RLC sequence number with respect to all preprocessed data, or non-allocation of the RLC sequence number with respect to partial data of the preprocessed data. For example, the sequence number may be allocated with respect to the first RLC PDU, and the sequence number may not be allocated with respect to the subsequent RLC PDUs. The RLC sequence number may be allocated only with respect to the partially preprocessed RLC PDUs through expecting uplink resource allocation, and the RLC sequence number may not be allocated with respect to the remaining preprocessed RLC PDUs.

The methods for implementing data preprocessing in dual connectivity according to the disclosure are schemes for accelerating the data processing, and may be methods that can be valuably applied to an uplink split bearer of the terminal and can also be valuably applied to a downlink split bearer of the base station.

Figure 14:
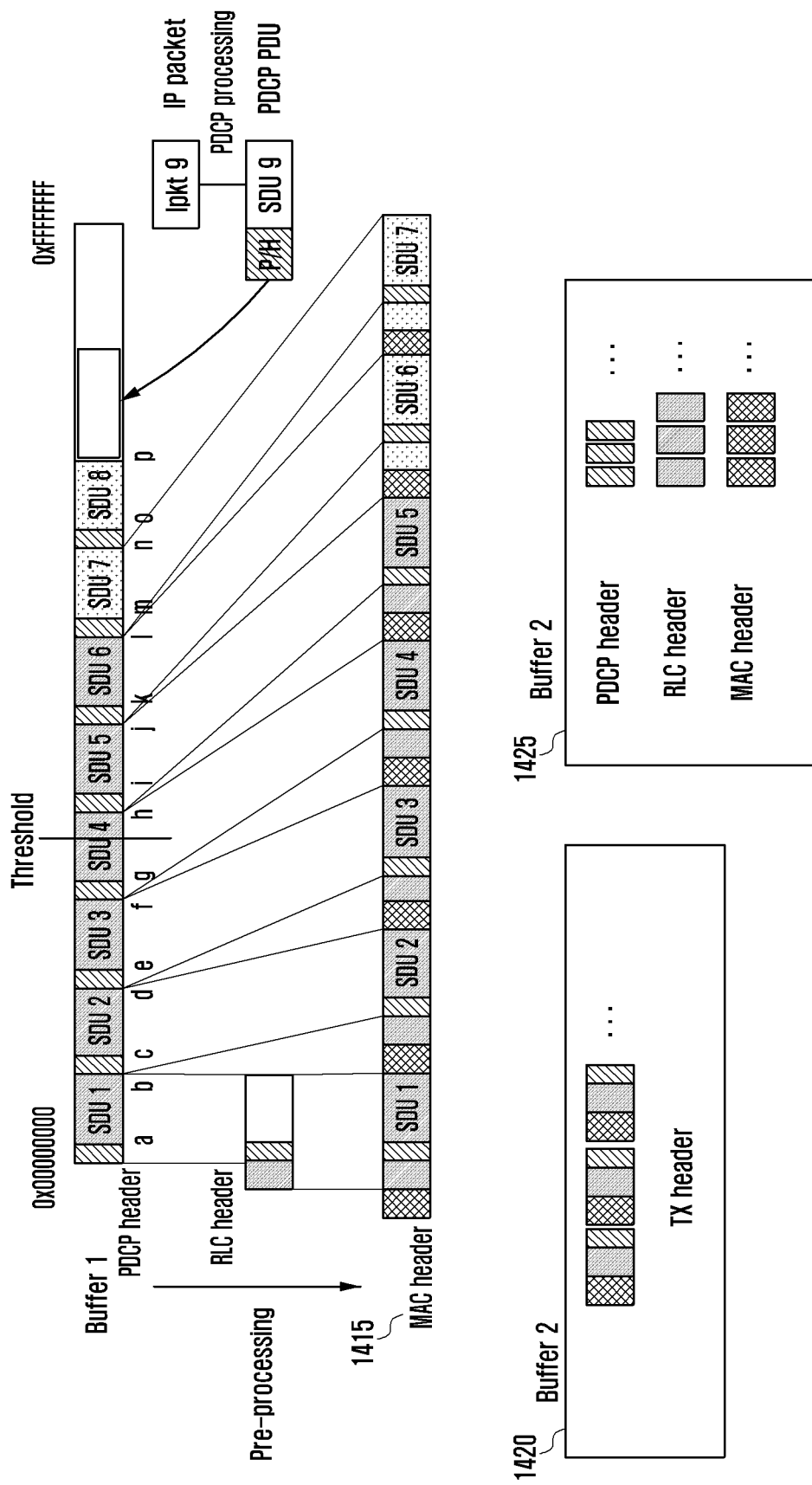
FIG. 14 is a diagram illustrating a modified implementation method of first to third embodiments of the disclosure.

FIG. 14 is a diagram illustrating a modified implementation method of first to third embodiments of the disclosure.

Referring to FIG. 14, a modified implementation method of the first to third embodiments of the disclosure. Referring to FIGS. 8, 9, and 10, the preprocessed data is managed in the mapping table in the unit including a header and data. Further, it is assumed that RLC sequence numbers or PDCP sequence numbers are successively located on a memory or a buffer in the order of the RLC sequence numbers or the PDCP sequence numbers. In the disclosure, the implementation methods as described above with reference to FIGS. 8 to 10 are exemplary to present the most efficient method. Other modified methods become possible.

As another implementation method, as shown in FIG. 14, the preprocessed data can be dividedly stored and managed for respective transmission headers (MAC headers, RLC headers, and PDCP headers) and data (1420). In the above case, fields indicating respective header addresses and fields indicating data may be respectively configured in the mapping table, and mapping information on the respective headers and data may be recorded. Further, as 1425, headers and data of respective layers may be individually stored and managed. In the mapping table, fields indicating addresses of individual headers and corresponding mapping information may be added and managed.

As described above with reference to FIG. 14, the method proposed in the disclosure can be implemented in various ways. Further, the data preprocessing technology is conceptually to preprocess the data as 1415, and may be differently implemented, such as storing and managing of the data, use of physically different buffers, logical division of buffers, independent management of several mapping tables, or divided management of the header and data.

In case of individually managing the header and the data, the header and the data may be concatenated to be transferred to a lower layer with reference to the corresponding memory addresses during configuration of the MAC PDUs.

The embodiment as described above with reference to FIG. 14 corresponds to management of preprocessed data in the mapping table, and may be applied in the same manner even in case of managing the mapping table through preprocessing of data allocated to the respective cell groups in accordance with the first allocation method, the (1-1)-th allocation method, the (1-2)-th allocation method, and the second allocation method according to the disclosure. That is, in the embodiments of FIGS. 8 to 10, the preprocessed data can be dividedly stored and managed in the mapping table for respective transmission headers (MAC headers, RLC headers, and PDCP headers) and data. In case of implementing the first to fourth embodiments of the disclosure, the data allocated to the respective cell groups in accordance with the first allocation method, the (1-1)-th allocation method, the (1-2)-th allocation method, and the second allocation method according to the disclosure is preprocessed, and the preprocessed data may be dividedly stored and managed in the mapping table for the respective transmission headers (MAC headers, RLC headers, and PDCP headers) and data, In the second embodiment of the disclosure, if segments of one RLC SDU is transmitted to a certain cell group (master cell group or secondary cell group), the remaining segments of the one RLC SDU should also be transmitted to the cell group; this is to make it possible to reassemble the RLC SDU in the receiving end since the remaining segments have the same RLC sequence number as that of the previously transmitted segments in the cell group to be divided into SI fields)

In the second embodiment of the disclosure, if it is determined to transmit data that has been preprocessed to be transmitted to the master cell group to the secondary cell group due to a specific reason (e.g., if the UL grant is first allocated to the secondary cell group), the RLC sequence number of an RLC header may be updated to match the secondary cell group, a logical channel identification (LCID) of a MAC sub-header may be updated to match a logical channel identification of an RLC layer device corresponding to the secondary cell group, and then a MAC layer device corresponding to the secondary cell group may perform a process for transmission (multiplexing, MAC header generation, or request for segmentation operation from an RLC layer, if necessary). In contrast, if it is determined to transmit data that has been preprocessed to be transmitted to the secondary cell group to the master cell group due to a specific reason (e.g., if the UL grant is first allocated to the master cell group), the RLC sequence number of the RLC header may be updated to match the master cell group, the logical channel identification (LCID) of the MAC sub-header may be updated to match the logical channel identification of the RLC layer device corresponding to the master cell group, and then the MAC layer device corresponding to the master cell group may perform a process for transmission (multiplexing, MAC header generation, or request for segmentation operation from the RLC layer, if necessary).

In the third embodiment of the disclosure, if segments of one RLC SDU is transmitted to a certain cell group (master cell group or secondary cell group), the remaining segments of the one RLC SDU should also be transmitted to the cell group; this is to make it possible to reassemble the RLC SDU in the receiving end since the remaining segments have the same RLC sequence number as that of the previously transmitted segments in the cell group to be divided into SI fields.

In the third embodiment of the disclosure, if it is determined to transmit data that has been preprocessed to the secondary cell group due to a specific reason (e.g., if the UL grant is first allocated to the secondary cell group), the RLC sequence number of an RLC header may be configured to match the secondary cell group, a logical channel identification (LCID) of a MAC sub-header may be updated to match a logical channel identification of an RLC layer device corresponding to the secondary cell group, and then a MAC layer device corresponding to the secondary cell group may perform a process for transmission (multiplexing, MAC header generation, or request for segmentation operation from an RLC layer, if necessary). In contrast, if it is determined to transmit data that has been preprocessed to the master cell group due to a specific reason (e.g., if the UL grant is first allocated to the master cell group), the RLC sequence number of the RLC header may be updated to match the master cell group, the logical channel identification (LCID) of the MAC sub-header may be updated to match the logical channel identification of the RLC layer device corresponding to the master cell group, and then the MAC layer device corresponding to the master cell group may perform a process for transmission (multiplexing, MAC header generation, or request for segmentation operation from the RLC layer, if necessary).

The procedure of performing data preprocessing in a single or dual-connectivity environment according to the disclosure may be applied as follows. Further, the applied data preprocessing method described below may be applied in the first to third embodiments proposed in the disclosure.

1. First embodiment of data preprocessing: In each PDCP layer, data preprocessing may be completed by ciphering DPCP SDU (IP packet or data packet), performing integrity protection if necessary, generating a PDCP header, allocating an RLC sequence number in each RLC layer, configuring a segmentation information (SI) field, and configuring an RLC header. If a MAC layer instructs respective RLC layer devices to satisfy a specific condition, the respective RLC layer devices may configure a length (L) field to match the size of the RLC PDU to process the preprocessed RLC PDU through the MAC layer, configure a logical channel identification (LCID) that matches the respective RLC layer devices, configure and multiplex respective MAC sub-headers and MAC SDUs through configuration of the MAC header, and configure the MAC PDU to match the size of the UL grant. The specific condition of the MAC layer may be when the UL grant is received from the base station, and when the UL grant is received, the respective RLC layers may be instructed to transfer the preprocessed RLC PDUs to the MAC layer device.

2. Second embodiment of data preprocessing: In the second embodiment of data preprocessing, respective PDCP headers and RLC headers may be separately generated, stored, and managed when the first embodiment of the data preprocessing is performed. When the data preprocessing is performed, the respective PDCP headers and the respective RLC headers may be pre-generated, processed, and stored. If it is required to perform segmentation operation due to lack of the grant after the UL grant is received, the SI field of the generated RLC header is updated (first segment is configured to 01, the last segment is configured to 10, and any segment excluding the first segment and the last segment is configured to 11), and if necessary, SO field may be dynamically added to the RLC header (if the segment is not the first segment, segment offset (SO) field having a size of 2 bytes is added to indicate an offset).

3. Third embodiment of data preprocessing: In the third embodiment of data preprocessing, the first embodiment of the data preprocessing is performed, and up to the data processing of a MAC layer device can be pre-performed. In this case, respective PDCP headers, RLC headers, and MAC headers may be separately generated, stored, and managed, that is, when the data preprocessing is performed, the respective PDCP headers, RLC headers, and MAC headers may be pre-generated, processed, and stored. If it is required to perform segmentation operation due to lack of the grant after the UL grant is received, the SI field of the generated RLC header is updated (first segment is configured to 01, the last segment is configured to 10, and any segment excluding the first segment and the last segment is configured to 11), and if necessary, SO field may be dynamically added to the RLC header (if the segment is not the first segment, segment offset (SO) field having a size of 2 bytes is added to indicate an offset).

The first to fourth calculation methods for comparing the data amount of the PDCP layer with the threshold value proposed as above can be applied to all the first to third embodiments.

In the single-connectivity data preprocessing procedure and the dual-connectivity data preprocessing procedure according to the disclosure, if a PDCP discard timer for the respective PDCP SDUs (or PDCP PDUs) expires, the PDCP layer may transfer an indication to discard the PDCP SDUs (or PDCP PDUs) to the RLC layer. When the indication is received, the RLC layer device may perform one of the following proposed procedures.

1. First Embodiment

If an indication to discard a certain PDCP PDU is received from the PDCP layer device, the RLC layer device immediately discards the PDCP PDU unless the RLC sequence number has already been allocated to the PDCP PDU. If the RLC sequence number has already been allocated, the RLC layer device does not discard the PDCP PDU.

2. Second Embodiment

If an indication to discard a certain PDCP PDU is received from the PDCP layer device, the RLC layer device immediately discards the PDCP PDU unless the RLC sequence number has already been allocated to the PDCP PDU. If the RLC sequence number has already been allocated and partial segments of the PDCP PDU have been transferred or transmitted to a lower layer, the RLC layer device does not discard the PDCP PDU. If the RLC sequence number has already been allocated and partial segments of the PDCP PDU have not been transferred or transmitted to the lower layer, the RLC layer device immediately discards the PDCP PDU. If the RLC PDU to which the RLC sequence number is allocated is discarded, the receiving end may request retransmission since an RLC sequence number gap occurs in the receiving end, and the transmitting end is unable to perform the retransmission since the PDCP PDU has not been transmitted (has been discarded), resulting in that transmission delay or disconnection phenomenon may occur. Accordingly, in order to address this problem, if the RLC layer device has discarded the RLC PDU to which the RLC sequence number is allocated, the RLC layer device may reallocate the RLC sequence number allocated to the discarded RLC PDU to a new PDCP PDU received from an upper layer, and transmit the received PDCP PDU so as to prevent the RLC sequence number gap from occurring in the receiving end. As another method, in case of allocating the RLC PDU to which the RLC sequence number is allocated, only the RLC SDU that is a data part is discarded, and only the RLC header and the PDCP header are transmitted so as to prevent the RLC sequence number gap from occurring in the receiving end.

If the base station configures the threshold value to infinity (or other arbitrarily large number) and includes an indication for indicating the master cell group or the secondary cell group in an RRC message (RRC connection reconfiguration) in a state where the first to third embodiments are applied in a dual-connectivity environment, the data can be transmitted only to the master cell group or the secondary cell group. Further, the base station may indicate through the RRC message to perform data transmission only to the master cell group or to perform data transmission only to the secondary cell group. That is, data transmission paths can be dynamically switched. If the base station indicates through the RRC message to perform transmission only to one-side cell group in a state where the terminal transmits the data in dual connectivity to the master cell group and the secondary cell group, the terminal may cancel (empty) all the data preprocessed to the other-side cell group, re-perform data preprocessing with respect to the PDCP PDUs (PDCP PDUs preprocessed to the other-side cell group) for the cell group indicated by the base station for the data transmission, and prepare the transmission. If the transmission is stopped with respect to the mater cell group or the secondary cell group, transmission delay may occur with respect to the preprocessed data, and the data may be lost. In this case, the transmission should be performed by re-processing the data to the other transmittable cell group.

Figure 15:
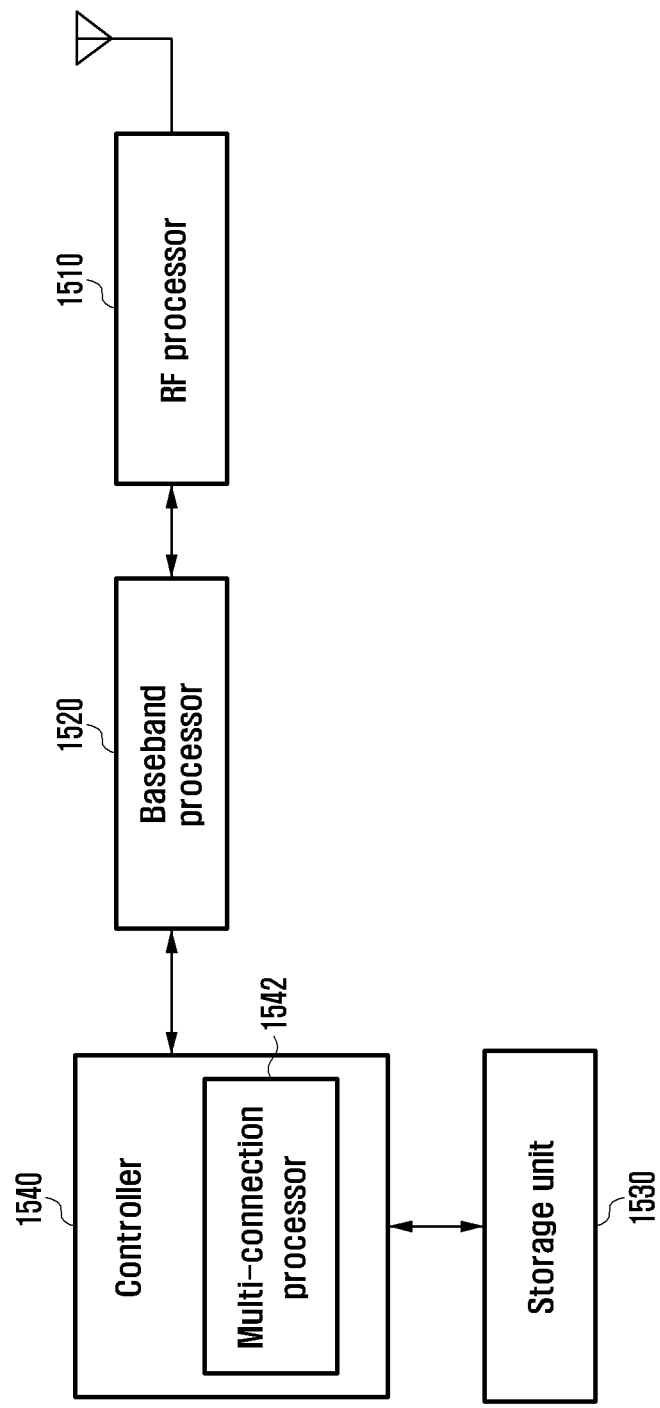
FIG. 15 is a diagram illustrating the structure of a terminal according to an embodiment of the disclosure.

FIG. 15 is a diagram illustrating the structure of a terminal according to an embodiment of the disclosure.

Referring to FIG. 15, the terminal includes a radio frequency (RF) processor 1510, a baseband processor 1520, a storage unit 1530, and a controller 1540.

The RF processor 1510 performs a function for transmitting and receiving a signal on a radio channel, such as signal band conversion and amplification. The RF processor 1510 performs up-conversion of a baseband signal provided from the baseband processor 1520 into an RF-band signal to transmit the converted signal to an antenna, and performs down-conversion of the RF-band signal received through the antenna into a baseband signal. For example, the RF processor 1510 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. The RF processor 1510 may include a plurality of RF chains. The RF processor 1510 may perform beamforming. For the beamforming, the RF processor 1510 may adjust phases and sizes of signals transmitted or received through the plurality of antennas or antenna elements. The RF processor may perform MIMO, and may receive several layers during performing of a MIMO operation. The RF processor 1510 may perform reception beam sweeping through proper configuration of the plurality of antennas or antenna elements under the control of the controller, or may control the direction and the beam width of the reception beam so that the reception beam is synchronized with the transmission beam.

The baseband processor 1520 performs conversion between a baseband signal and a bit string in accordance with the physical layer standard of the system. For example, during data transmission, the baseband processor 1520 generates complex symbols by encoding and modulating a transmitted bit string. During data reception, the baseband processor 1520 restores a received bit string by demodulating and decoding the baseband signal provided from the RF processor 1510. For example, in the case of following an OFDM method, during data transmission, the baseband processor 1520 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. During data reception, the baseband processor 1520 divides the baseband signal provided from the RF processor 1510 in the unit of OFDM symbols, restores the signals mapped on the subcarriers through the fast Fourier transform (FFT) operation, and then restores the received bit string through demodulation and decoding.

The baseband processor 1520 and the RF processor 1510 transmit and receive the signals as described above. Accordingly, the baseband processor 1520 and the RF processor 1510 may be called a transmitter, a receiver, a transceiver, or a communication unit. In order to support different radio connection technologies, at least one of the baseband processor 1520 and the RF processor 1510 may include a plurality of communication modules. Further, in order to process signals of different frequency bands, at least one of the baseband processor 1520 and the RF processor 1510 may include different communication modules. For example, the different radio connection technologies may include an LTE network and an NR network. The different frequency bands may include super high frequency (SHF) (e.g., 2.5 GHz or 5 GHz) band and millimeter wave (mm-Wave) (e.g., 60 GHz) band.

The storage unit 1530 stores therein a basic program for an operation of the terminal, application programs, and data of configuration information. The storage unit 1530 provides stored data in accordance with a request from the controller 1540.

The controller 1540 controls the whole operation of the terminal. For example, the controller 1540 transmits and receives signals through the baseband processor 1520 and the RF processor 1510. The controller 1540 records or reads data in or from the storage unit 1530. For this, the controller 1540 may include at least one processor. For example, the controller 1540 may include a communication processor (CP) performing a control for communication and an application processor (AP) controlling an upper layer, such as an application program. Also the controller 1540 may include multi-connection processor 1542.

According to an embodiment of the disclosure, the controller 1540 may control to acquire data, determine a cell group to preprocess the data based on an amount of the data and a threshold value, preprocess the data by the determined cell group before receiving an uplink grant for transmitting the data, and determine a RLC sequence number of the preprocessed data based on the uplink grant if the uplink grant is received.

In this case, the preprocessing may include processing the acquired data by at least one layer lower than a PDCP layer before receiving the uplink grant. The preprocessing may include generating an RLC PDU by an RLC layer of the terminal based on the acquired data.

The controller 1540 may determine a link to transmit the generated RLC PDU based on the uplink grant, and allocate the RLC sequence number for the determined link.

The controller 1540 may allocate a virtual RLC sequence number during the preprocessing, and reallocate the RLC sequence number based on a size of the uplink grant if the uplink grant is received.

The controller 1540 may control to preprocess the data by a predetermined cell group if the amount of the data is smaller than the threshold value, to preprocess the amount of the data corresponding to the threshold value by a predetermined cell group if the amount of the data is larger than the threshold value, and to process the remaining data after the uplink grant is received.

The controller 1540 may preprocess the data in accordance with a predetermined ratio or a predetermined amount for a master cell group and a secondary cell group if the amount of the data is larger than the threshold value, and process the remaining data after the uplink grant is received.

The controller 1540 may store the preprocessed data in a mapping table in a state where the preprocessed data is separated into a header and data of each layer.

The configuration and operation of the controller 1540 is not limited to the above-described configuration, and the operation of the terminal as described above through the respective embodiments of the disclosure may be performed or controlled by the controller 1540.

Figure 16:
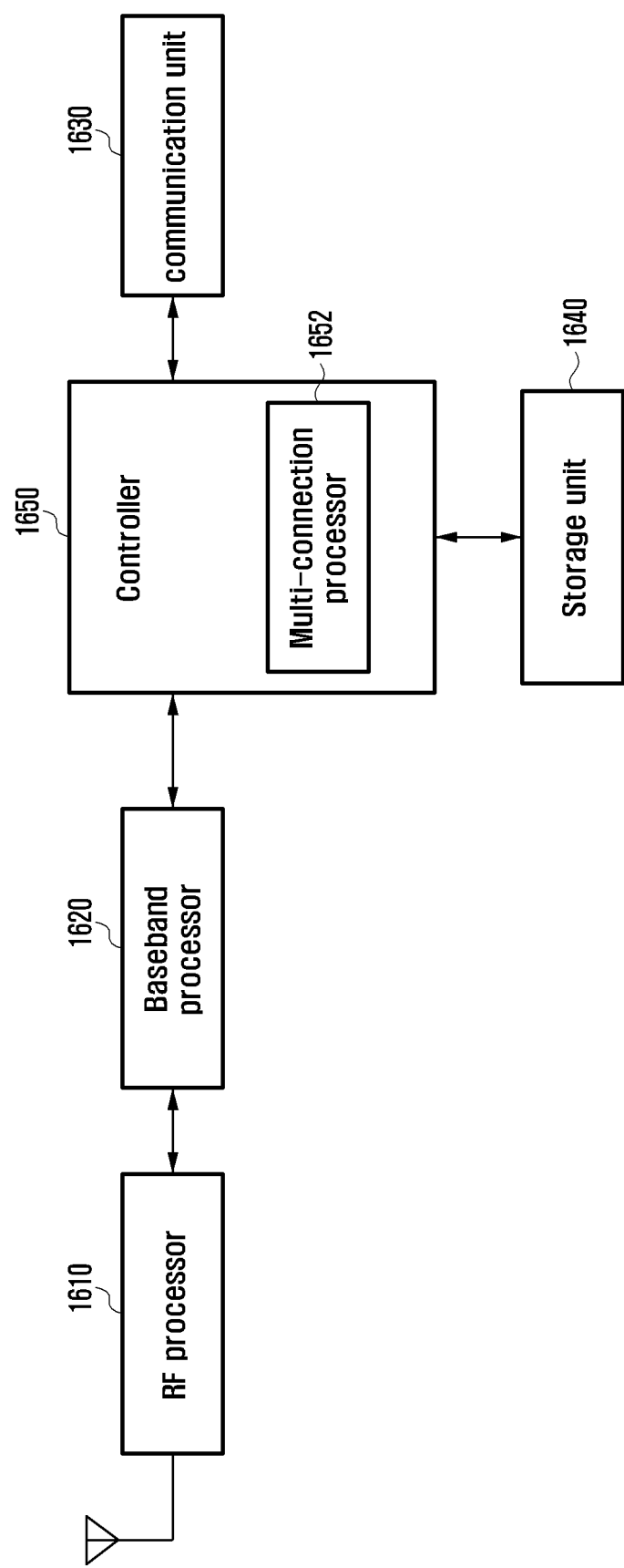
FIG. 16 is a diagram illustrating the block configuration of a transmission and reception point (TRP) in a wireless communication system according to an embodiment of the disclosure.

FIG. 16 is a diagram illustrating the block configuration of a transmission and reception point (TRP) according to an embodiment of the disclosure. The TRP may be called a base station.

Referring to FIG. 16, the base station may include an RF processor 1610, a baseband processor 1620, a communication unit 1630, a storage unit 1640, and a controller 1650.

The RF processor 1610 performs a function for transmitting and receiving a signal on a radio channel, such as signal band conversion and amplification. The RF processor 1610 performs up-conversion of a baseband signal provided from the baseband processor 1620 into an RF-band signal to transmit the converted signal to an antenna, and performs down-conversion of the RF-band signal received through the antenna into a baseband signal. For example, the RF processor 1610 may include a transmission filter, a reception filter, an amplifier, a mixer, an oscillator, a DAC, and an ADC. Although only one antenna is illustrated in the drawing, the first connection node may be provided with a plurality of antennas. The RF processor 1610 may include a plurality of RF chains. The RF processor 1610 may perform beamforming. For the beamforming, the RF processor 1610 may adjust phases and sizes of signals transmitted or received through the plurality of antennas or antenna elements. The RF processor may perform down MIMO operation through transmission of one or more layers.

The baseband processor 1620 performs conversion between a baseband signal and a bit string in accordance with the physical layer standard of the first radio connection technology. For example, during data transmission, the baseband processor 1620 generates complex symbols by encoding and modulating a transmitted bit string. Further, during data reception, the baseband processor 1620 restores a received bit string by demodulating and decoding the baseband signal provided from the RF processor 1610. For example, in the case of following an OFDM method, during data transmission, the baseband processor 1620 generates complex symbols by encoding and modulating a transmitted bit string, performs mapping of the complex symbols on subcarriers, and then configures OFDM symbols through the IFFT operation and CP insertion. During data reception, the baseband processor 1620 divides the baseband signal provided from the RF processor 1610 in the unit of OFDM symbols, restores the signals mapped on the subcarriers through the FFT operation, and then restores the received bit string through demodulation and decoding. The baseband processor 1620 and the RF processor 1610 transmit and receive the signals as described above. Accordingly, the baseband processor 1620 and the RF processor 1610 may be called a transmitter, a receiver, a transceiver, a communication unit, or a wireless communication unit.

The communication unit 1630 provides an interface for performing communication with other nodes in the network. The communication unit 1630 may be called a backhaul communication unit 1630.

The storage unit 1640 stores a basic program for an operation of the main base station, application programs, and data of configuration information. In particular, the storage unit 1640 may store information on a bearer allocated to the connected terminal and the measurement result reported from the connected terminal. The storage unit 1640 may store information that becomes a basis of determination whether to provide or suspend a multi-connection to the terminal. The storage unit 1640 provides stored data in accordance with a request from the controller 1650.

The controller 1650 controls the whole operation of the main base station. For example, the controller 1650 transmits and receives signals through the baseband processor 1620 and the RF processor 1610 or through the backhaul communication unit 1630. The controller 1650 records or reads data in or from the storage unit 1640. For this, the controller 1650 may include at least one processor. Also the controller 1650 may include multi-connection processor 1652.

Further, the controller 1650 may control the operation of the base station according to the respective embodiments of the disclosure. For example, the controller 1650 may control allocation of uplink resources to the terminal and reception of uplink data from the terminal.

Embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the present disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal configured with a dual connectivity, the method comprising:
    acquiring data;
    determining a cell group associated with processing the data; and
    generating a radio link control (RLC) protocol data unit (PDU) including an RLC SDU and an RLC header based on the data before receiving an uplink grant for transmitting the data, the RLC header including an RLC sequence number of the data.

2. The method of claim 1, further comprising:
    generating a packet data convergence protocol (PDCP) PDU based on the data before receiving the uplink grant.

3. The method of claim 1, further comprising:
    generating a medium access control (MAC) header based on the RLC PDU and the RLC sequence number.

4. The method of claim 1,
    wherein the data is processed by a predetermined cell group before receiving the uplink grant in case that an amount of the data is smaller than a threshold value, and
    wherein the data is processed based on a predetermined ratio or a predetermined amount for a master cell group and a secondary cell group in case that the amount of the data is larger than the threshold value.

5. The method of claim 1, wherein a link to transmit the generated RLC PDU based on the uplink grant is determined.

6. The method of claim 1,
    wherein the RLC header includes segment information, and
    wherein the segment information is updated in case that the uplink grant is received and a medium access control (MAC) PDU does not encapsulate the processed RLC PDU based on the uplink grant.

7. The method of claim 6, wherein an L field of a MAC header is updated based on a segmentation of the RLC PDU.

8. The method of claim 1, wherein the data is preprocessed based on at least one of an indication from a lower layer or an amount of preprocessed data is lower than a threshold value.

9. The method of claim 1, wherein a preprocessing in a packet data convergence protocol (PDCP) layer of the terminal is performed in case that a data amount of data in the PDCP layer is smaller than a threshold value.

10. The method of claim 9, wherein the amount of the data corresponds to an amount of data not preprocessed in the PDCP layer.

11. A terminal configured with a dual connectivity, the terminal comprising:
    a transceiver; and
    a controller configured to:
        acquire data,
        determine a cell group associated with processing the data, and
        generate a radio link control (RLC) protocol data unit (PDU) including an RLC SDU and an RLC header based on the data before receiving an uplink grant for transmitting the data, the RLC header including an RLC sequence number of the data.

12. The terminal of claim 11, wherein the controller is further configured to generate a packet data convergence protocol (PDCP) PDU based on the data before receiving the uplink grant.

13. The terminal of claim 11, wherein the controller is further configured to generate a medium access control (MAC) header based on the RLC PDU and the RLC sequence number.

14. The terminal of claim 11,
    wherein the data is processed by a predetermined cell group before receiving the uplink grant in case that an amount of the data is smaller than a threshold value, and
    wherein the data is processed based on a predetermined ratio or a predetermined amount for a master cell group and a secondary cell group in case that the amount of the data is larger than the threshold value.

15. The terminal of claim 11,
    wherein a link to transmit the generated RLC PDU based on the uplink grant is determined.

16. The terminal of claim 11,
    wherein the RLC header includes segment information, and
    wherein the segment information is updated in case that the uplink grant is received and a medium access control (MAC) PDU does not encapsulate the processed RLC PDU based on the uplink grant.

17. The terminal of claim 16, wherein an L field of a MAC header is updated based on a segmentation of the RLC PDU.

18. The terminal of claim 11, wherein the data is preprocessed based on at least one of an indication from a lower layer or an amount of preprocessed data is lower than a threshold value.

19. The terminal of claim 11, wherein a preprocessing in a packet data convergence protocol (PDCP) layer of the terminal is performed in case that a data amount of data in the PDCP layer is smaller than a threshold value.

20. The terminal of claim 19, wherein the amount of the data corresponds to an amount of data not preprocessed in the PDCP layer.

\* \* \* \* \*